(12) United States Patent
Irani et al.

(10) Patent No.: US 10,389,987 B2
(45) Date of Patent: Aug. 20, 2019

(54) INTEGRATED ACCESSORY CONTROL USER INTERFACE

(71) Applicant: Apple Inc., Cupertino, CA (US)

(72) Inventors: Cyrus D. Irani, Los Altos, CA (US); Kevin P. McLaughlin, Waikoloa, HI (US); Anush G. Nadathur, San Jose, CA (US); Arun G. Mathias, Los Gatos, CA (US); Vinay A. Ramaswamy, San Jose, CA (US); Christopher D. Soli, Santa Cruz, CA (US); Patrick L. Coffman, San Francisco, CA (US); Stephen O. Lemay, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 15/275,266

(22) Filed: Sep. 23, 2016

(65) Prior Publication Data

US 2017/0359555 A1 Dec. 14, 2017

Related U.S. Application Data

(60) Provisional application No. 62/348,997, filed on Jun. 12, 2016.

(51) Int. Cl.
*H04N 7/18* (2006.01)
*G07C 9/00* (2006.01)
(Continued)

(52) U.S. Cl.
CPC .............. *H04N 7/186* (2013.01); *G06F 3/048* (2013.01); *G07C 9/00309* (2013.01);
(Continued)

(58) Field of Classification Search
CPC .............. G07C 9/00309; G08B 21/182; H04N 5/23206; H04N 5/77; H04N 7/186
(Continued)

(56) References Cited

U.S. PATENT DOCUMENTS 7,835,406 B2  11/2010  Oran et al.
8,629,938 B2*  1/2014  Wong ...................... G06F 3/011
                                                              340/540

(Continued)

OTHER PUBLICATIONS 1 by one, "Video Door Phone." Downloaded from https://www.1byone.com/Video-Door-Phone on Nov. 21. 7 pages.
(Continued)

*Primary Examiner* — Gelek W Topgyal
(74) *Attorney, Agent, or Firm* — Kilpatrick, Townsend and Stockton LLP

(57) ABSTRACT

An integrated accessory control system can integrate functionality (services) of multiple disparate accessories and provide a unified user interface for interacting with the system via a controller device. An integrated accessory control system can include one accessory that can detect an event or action and send a notification to the controller device and at least one other accessory, such as an IP camera, that can be operated in response to the notification. In response to the notification, a controller device can generate an integrated user interface for interacting with the accessories in the integrated accessory control system. The interface can include a live feed from the IP camera, which can provide a media stream responsive to instructions from the controller.

9 Claims, 31 Drawing Sheets

(51) Int. Cl.
| | |
|---|---|
| *G08B 21/18* | (2006.01) |
| *H04N 5/232* | (2006.01) |
| *H04N 5/77* | (2006.01) |
| *H04W 76/11* | (2018.01) |
| *H04L 12/28* | (2006.01) |
| *G06F 3/048* | (2013.01) |
| *G05B 19/042* | (2006.01) |
| *H04L 12/26* | (2006.01) |
| *H04L 12/841* | (2013.01) |
| *H04L 29/06* | (2006.01) |
| *H04L 29/08* | (2006.01) |

(52) U.S. Cl.
CPC .......... *G08B 21/182* (2013.01); *H04L 12/282* (2013.01); *H04L 12/2803* (2013.01); *H04L 12/2818* (2013.01); *H04L 43/0864* (2013.01); *H04L 47/283* (2013.01); *H04L 65/1069* (2013.01); *H04L 65/4069* (2013.01); *H04L 67/125* (2013.01); *H04L 67/141* (2013.01); *H04L 67/146* (2013.01); *H04N 5/23206* (2013.01); *H04N 5/77* (2013.01); *H04N 7/18* (2013.01); *H04W 76/11* (2018.02); *G05B 19/042* (2013.01); *G05B 2219/2642* (2013.01); *H04N 7/183* (2013.01)

(58) Field of Classification Search
USPC .................................................. 348/143–159
See application file for complete search history.

(56) References Cited

U.S. PATENT DOCUMENTS

| | | | |
|---|---|---|---|
| 9,979,625 B2 | 5/2018 | Mclaughlin et al. | |
| 10,257,474 B2 | 4/2019 | Nadathur et al. | |
| 2004/0075738 A1* | 4/2004 | Burke | G08B 13/19656 348/143 |
| 2005/0018049 A1* | 1/2005 | Falk | H04N 5/232 348/207.99 |
| 2007/0070190 A1* | 3/2007 | Yin | G08B 13/19626 348/36 |
| 2009/0167862 A1* | 7/2009 | Jentoft | G08B 13/19641 348/143 |
| 2010/0145479 A1* | 6/2010 | Griffiths | G01D 21/00 700/17 |
| 2011/0030016 A1* | 2/2011 | Pino, Jr. | H04L 12/2818 725/80 |
| 2012/0158978 A1 | 6/2012 | Narayana et al. | |
| 2012/0198246 A1* | 8/2012 | German | H04Q 1/136 713/300 |
| 2013/0057695 A1* | 3/2013 | Huisking | H04N 7/186 348/156 |
| 2013/0057698 A1 | 3/2013 | Hayes et al. | |
| 2014/0267751 A1* | 9/2014 | Kitagawa | H04N 7/181 348/159 |
| 2014/0362213 A1* | 12/2014 | Tseng | G08B 21/0476 348/143 |
| 2015/0161882 A1* | 6/2015 | Lett | G08B 25/001 340/506 |
| 2015/0381945 A1* | 12/2015 | Renkis | G06K 9/00771 348/48 |
| 2016/0072821 A1* | 3/2016 | Wu | H04L 69/16 726/4 |
| 2016/0105644 A1* | 4/2016 | Smith | H04N 5/23206 348/159 |
| 2016/0323548 A1* | 11/2016 | Khot | G06F 3/04842 |
| 2016/0380789 A1 | 12/2016 | Gunnalan et al. | |
| 2016/0380966 A1 | 12/2016 | Gunnalan et al. | |
| 2016/0380967 A1 | 12/2016 | Moore et al. | |
| 2018/0103239 A1* | 4/2018 | Sinninoff | H04M 1/0291 |

OTHER PUBLICATIONS

August Home, "Doorbell Cam FAQ." Downloaded from http://support.august.com/Customer/en/portal/articles/2164772-doorbell-cam-faq?b_id=10920& on Nov. 21, 2016. 3 pages.
Aiphone Corporation, "JF-DA/DV/DVF Spec Sheet, Camera Door Stations for the JF series". www.aiphone.com. 2 pages.
Skybell HD, "Wi-Fi Video Doorbell User Guide." http://www.skybell.com/support. Copyright © 2016. 9 pages.
August Home, "Doorbell Cam Installation—Installing With the Spacer." Downloaded from http://support.august.com/customer/en/portal/articles/2269857-doorbell-cam-installation---installing-with-the-spacer?b_id=10920 on Nov. 21, 2016. 25 pages.
Vivint Smart Home, "Doorbell Camera." Downloaded from http://www.vivint.com/products-camera on Nov. 21, 2016. 6 pages.
Aiphone Corporation, "JF Series Brochure, Hands-Free Video Intercom." www.aiphone.com. Aug. 2015. 4 pages.
Skybell HD, "Wi-Fi Video Doorbell Installation Guide." www.skybell.com/support/installation/. 15 pages.
Skybell HD, "Wi-Fi Video Doorbell." Downloaded from http://www.skybell.com/product/skybell-video-doorbell-hd/ on Nov. 21, 2016. 13 pages.
Ring, "Media Kit—The Ring Video Doorbell." BIGfish Communications, Meredith Frazier media@ring.com. 4 pages.
Ring Video Doorbell, "Setup and Installation Guide." www.ring.com/help. Last updated Mar. 21, 2016. 20 pages.
Chui, "Intelligent Doorbell." Downloaded from http://blog.getchui.com/ on Nov. 21, 2016. 60 pages.
Ring, "Product Features." © BOT Home Automation. 1 page.
International Search Report and Written Opinion dated Sep. 14, 2017 in International Application No. PCT/US2017/035211. 22 pages.
Invitation to Pay Additional Fees, mailed Jul. 24, 2017 in International Application No. PCT/US2017/035211. 22 pages.
First Action Interview Pilot Program Pre-Interview Communication issued in U.S. Appl. No. 15/275,277, dated Oct. 11, 2018, 5 pages.
International Preliminary Report on Patentability issued in PCT Application No. PCT/US2017/035211, dated Dec. 27, 2018 in 15 pages.

* cited by examiner

| SERVICE | PROPERTY | VALUE |
|---|---|---|
| RTP Stream Management<br><br>*602* | Type | com.proto.svc.rtp-stream-management |
| | Required Ch. | com.proto.ch.streaming-status |
| | | com.proto.ch.supported-video-config |
| | | com.proto.ch.supported-rtp-config |
| | | com.proto.ch.setup-endpoints |
| | | com.proto.ch.selected-stream-config |
| | Optional Ch. | com.proto.ch.supported-audio-config |
| Camera Control<br><br>*604* | Type | com.proto.svc.camera-control |
| | Optional Ch. | com.proto.ch.horizontal-tilt |
| | | com.proto.ch.vertical-tilt |
| | | com.proto.ch.optical-zoom |
| | | com.proto.ch.digital-zoom |
| | | com.proto.ch.image-rotation |
| | | com.proto.ch.image-mirroring |
| | | com.proto.ch.night-vision |

*FIG. 6*

| CHARACTERISTIC | PROPERTY | VALUE |
|---|---|---|
| Streaming Status 702 | Type | com.proto.ch.streaming-status |
| | Permissions | Paired Read, Paired Notify |
| | Format | <int> |
| Supported Video Configuration 704 | Type | com.proto.ch.supported-video-config |
| | Permissions | Paired Read |
| | Format | Array of <object> [See FIG. 7B, 7C] |
| Supported Audio Configuration 706 | Type | com.proto.ch.supported-audio-config |
| | Permissions | Paired Read |
| | Format | Array of <object> [See FIGs. 7D, 7E] |
| Supported RTP Configuration 708 | Type | com.proto.ch.supported-rtp-config |
| | Permissions | Paired Read |
| | Format | <object> |
| Setup Endpoints 712 | Type | com.proto.ch.setup-endpoints |
| | Permissions | Paired Read, Paired Write |
| | Format | <object> [See FIGs. 7F, 7G] |
| Selected Stream Configuration 714 | Type | com.proto.ch.selected-stream-config |
| | Permissions | Paired Write |
| | Format | <object> |

*FIG. 7A*

| KEY NAME | VALUE TYPE | DESCRIPTION |
|---|---|---|
| "video-codec-type" 722 | int | Index identifying type of video codec used |
| "video-codec-params" 724 | object | Data object providing params specific to video codec type |
| "video-attributes" 726 | object | Data object specifying image size and maximum frame rate |

*FIG. 7B*

| KEY NAME | VALUE TYPE | DESCRIPTION |
|---|---|---|
| "profile-ID" 731 | int | Index identifying type of H.264 profile |
| "support-level" 732 | int | Index indicating profile support level |
| "packetization-mode" 733 | int | Index indicating packet interleaving |
| "CVO-enabled" 734 | boolean | Whether CVO extension to RTP is enabled |
| "CVO-ID" 735 | int | ID for CVO extension (if enabled)) |

*FIG. 7C*

| KEY NAME | VALUE TYPE | DESCRIPTION |
|---|---|---|
| "audio-codec-type" 723 | int | Index identifying type of audio codec used |
| "audio-codec-params" 725 | TLV | Data object providing params specific to audio codec type |

*FIG. 7D*

| KEY NAME | VALUE TYPE | DESCRIPTION |
|---|---|---|
| "channels" 736 | int | Number of audio channels |
| "bit-rate" 737 | boolean | Constant or variable bit rate |
| "sample-rate" 738 | int | Index identifying sample rate |
| "RTP-ptime" 739 | int | Index identifying packet time |

*FIG. 7E*

| KEY NAME | VALUE TYPE | DESCRIPTION |
|---|---|---|
| "session-ID" 751 | UUID | UUID for the streaming session the command applies to |
| "controller-address" 752 | object | IP Address and port identifiers of the controller for the streaming session |
| "srtp-video-parameters" 753 | object | SRTP parameters for video streaming session (crypto suite, master key, master salt) |
| "srtp-audio-parameters" 754 | object | SRTP parameters for audio streaming session (crypto suite, master key, master salt) |

*FIG. 7F*

| KEY NAME | VALUE TYPE | DESCRIPTION |
|---|---|---|
| "session-ID" 761 | UUID | UUID for the streaming session the command applies to |
| "status" 762 | Int | Status code for the setup operation |
| "accessory-address" 763 | object | IP Address and port identifiers of the accessory for the streaming session |
| "srtp-video-parameters" 764 | object | SRTP parameters for video streaming session (crypto suite, master key, master salt) |
| "srtp-audio-parameters" 765 | object | SRTP parameters for audio streaming session (crypto suite, master key, master salt) |
| "sync-source-video" 766 | int | SSRC for video RTP stream |
| "sync-source-audio" 767 | int | SSRC for audio RTP stream |

*FIG. 7G*

| KEY NAME | VALUE TYPE | DESCRIPTION |
|---|---|---|
| "session-ID" 771 | UUID | UUID for the streaming session the command applies to |
| "command" 772 | int | Identifier of a session control command (start, end, suspend, resume, reconfigure) |
| "selected-video-parameters" 773 | object | Descriptor for video parameters to be used for the streaming session |
| "selected-audio-parameters" 774 | object | Descriptor for audio parameters to be used for the streaming session |

*FIG. 7H*

| KEY NAME | VALUE TYPE | DESCRIPTION |
|---|---|---|
| "video-codec-type" 781 | int | Index identifying type of codec to be used |
| "video-codec-params" 782 | object | Data object providing params specific to codec type |
| "video-attributes" 783 | object | Data object specifying image size and maximum frame rate |
| "video-rtp-params" 784 | object | Data object specifying payload type, sync source (SSRC) for video, max bitrate, min RTCP interval, and max MTU |

*FIG. 7I*

| KEY NAME | VALUE TYPE | DESCRIPTION |
|---|---|---|
| "audio-codec-type" 785 | int | Index identifying type of codec to be used |
| "audio-codec-params" 786 | TLV | Data object providing params specific to codec type |
| "comfort-noise" 787 | boolean | Indicates whether both endpoints will or will not use Comfort Noise codec |
| "audio-rtp-params" 788 | TLV | Data object specifying payload type, sync source (SSRC) for audio, max bitrate, min RTCP interval, and Comfort Noise payload type |

*FIG. 7J*

| SERVICE | PROPERTY | VALUE |
|---|---|---|
| Doorbell | Type | com.proto.svc.doorbell |
| | Required Ch. | com.proto.ch.programmable-switch-event |
| 802 | Optional Ch. | com.proto.ch.volume |
| | | com.proto.ch.brightness |

FIG. 8

| CHARACTERISTIC | PROPERTY | VALUE |
|---|---|---|
| Programmable Switch Event 902 | Type | com.proto.ch.programmable-switch-event |
| | Permissions | Paired Notify |
| | Format | <int> |
| Volume 904 | Type | com.proto.ch.volume |
| | Permissions | Paired Read, Paired Write, Paired Notify |
| | Format | <float> |
| Brightness 906 | Type | com.proto.ch.brightness |
| | Permissions | Paired Read, Paired Write, Paired Notify |
| | Format | <float> |

FIG. 9

| SERVICE | PROPERTY | VALUE |
|---|---|---|
| Lock Mechanism<br><br>*1002* | Type | com.proto.svc.lock-mechanism |
| | Required Ch. | com.proto.ch.lock-mech-current-state |
| | | com.proto.ch.lock-mech-target state |

*FIG. 10*

| CHARACTERISTIC | PROPERTY | VALUE |
|---|---|---|
| Lock Mechanism<br>Current State<br><br>*1102* | Type | com.proto.ch.lock-mech-current-state |
| | Permissions | Paired Read, Paired Notify |
| | Format | <enum> |
| | Valid values | Locked, Unlocked, Locking, Unlocking |
| Lock Mechanism<br>Target State<br><br>*1104* | Type | com.proto.ch.lock-mech-target-state |
| | Permissions | Paired Write, Paired Notify |
| | Format | <enum> |
| | Valid values | Locked, Unlocked |

*FIG. 11*

| SERVICE | PROPERTY | VALUE |
|---|---|---|
| Light  1202 | Type | com.proto.svc.light |
| | Required Ch. | com.proto.ch.on |
| | Optional Ch. | com.proto.ch.brightness |

FIG. 12

| CHARACTERISTIC | PROPERTY | VALUE |
|---|---|---|
| On  1302 | Type | com.proto.ch.on |
| | Permissions | Paired Read, Paired Write, Paired Notify |
| | Format | <boolean> |
| Brightness  1304 | Type | com.proto.ch.brightness |
| | Permissions | Paired Read, Paired Write, Paired Notify |
| | Format | <float> |

FIG. 13

| SERVICE | PROPERTY | VALUE |
|---|---|---|
| Microphone<br><br>*1402* | Type | com.proto.svc.microphone |
| | Required Ch. | com.proto.ch.mute |
| | Optional Ch. | com.proto.ch.volume |
| Speaker<br><br>*1404* | Type | com.proto.svc.speaker |
| | Required Ch. | com.proto.ch.mute |
| | Optional Ch. | com.proto.ch.volume |
| RTP Audio Management<br><br><br><br><br>*1406* | Type | com.proto.svc.rtp-audio-management |
| | Required Ch. | com.proto.ch.streaming-status |
| | | com.proto.ch.supported-audio-config |
| | | com.proto.ch.supported-rtp-config |
| | | com.proto.ch.setup-endpoints |
| | | com.proto.ch.selected-stream-config |

*FIG. 14*

| CHARACTERISTIC | PROPERTY | VALUE |
|---|---|---|
| Mute<br><br>*1502* | Type | com.proto.ch.mute |
| | Permissions | Paired Read, Paired Write, Paired Notify |
| | Format | <boolean> |
| Volume<br><br>*1504* | Type | com.proto.ch.volume |
| | Permissions | Paired Read, Paired Write, Paired Notify |
| | Format | <float> |

*FIG. 15*

INTEGRATED ACCESSORY CONTROL USER INTERFACE

CROSS-REFERENCES TO RELATED APPLICATIONS

This application claims the benefit of U.S. Provisional Application No. 62/348,997, filed Jun. 12, 2016, the disclosure of which is incorporated herein by reference.

This disclosure is also related to the following U.S. patent applications: application Ser. No. 14/614,914, filed Feb. 5, 2015; application Ser. No. 14/725,891, filed May 29, 2015; application Ser. No. 14/725,912, filed May 29, 2015; application Ser. No. 15/093,213, titled "Controlling Accessory Groups," filed Apr. 7, 2016; and application Ser. No. 15/275,277, titled "Network Configurations for Integrated Accessory Control," filed of even date herewith. The disclosures of these applications are incorporated by reference herein in their entirety.

BACKGROUND

This disclosure relates generally to accessory control systems and in particular to an integrated accessory control system that can include real-time viewing of video from an IP camera.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable devices, such as thermostats, lighting devices, home security devices, etc. Users want to control these devices easily and conveniently using mobile devices and the like and to automate their operation.

SUMMARY

Certain embodiments of the present invention relate to an integrated accessory control system that can integrate functionality (services) of multiple disparate accessories and provide a unified user interface for interacting with the system via a controller device (e.g., a user's mobile phone, tablet, wearable device, or the like). In some embodiments, the integrated accessory control system can include one accessory that can act as an "activator" for the system. The activator accessory can include a sensor capable of detecting an event or action; examples can include operating a doorbell, flipping a switch, moving through an area, movement of an object, making sounds, etc. The integrated accessory control system can also include at least one accessory that the user may desire to make operational in response to detection of the event or action by the accessory. The term "integrated" in this context is intended to indicate that the control system is integrated; the system can include disparate accessories (e.g., accessories separately manufactured and sold) and there is no requirement that the included accessories communicate with each other or even know that other included accessories exist. The integration can be provided by the controller device, which can have information identifying the accessories included in the integrated accessory control system and their relationship to each other.

In some embodiments, an integrated accessory control system can include an IP camera, which can be any device that is capable of capturing video images and streaming data representing the images to some other device that can display and/or store them (e.g., using protocols based on the Internet Protocol (IP) suite). When the activator accessory of the integrated accessory control system detects an event or action, the activator accessory can notify a controller device, and the controller device can activate the IP camera. In some embodiments, the controller device can generate a user alert and activate the IP camera based on user input received in response to the user alert. Based on the user input, the controller device can also present a user interface to allow interactions with any accessory that is included in the integrated accessory control system.

As a specific example, one type of integrated accessory control system can be an integrated entry control system that can be used to remotely control access to a door. The activator accessory can be, for example, a doorbell located near the door, and the integrated entry control system can include an IP camera positioned to provide a view of an area around the door. The integrated entry control system can also include a lock accessory that provides a door lock capable of being remotely operated by a controller device to lock or unlock the door. Additional accessories can also be included, such as a remotely controllable light to illuminate the area around the door, an alarm system, a one-way or two-way intercom system, and so on. In operation, the integrated entry control system can be triggered when a person operates the doorbell that is included in the integrated entry control system. Operation of the doorbell can result in notifying a controller device (which may be inside or outside the local environment where the accessories are located). The controller device can generate an alert to the user and prompt the user to interact with the integrated entry control system. If the user chooses to interact, the controller device can obtain a live video stream from the IP camera of the integrated entry control system and present the live video to the user along with an interface that provides options for further interactions with the integrated entry control system. Depending on implementation, the options can include unlocking the door lock, operating a light, arming or disarming an alarm associated with the door, activating audio streaming to communicate with the person at the door, and/or other options determined based on the particular accessory services that are included in the integrated entry control system. The operations can be conducted without any of the accessories communicating with each other or even being aware of each other's existence; all communication can occur between an accessory as one endpoint and a controller device as the other endpoint.

In some embodiments, definition of an integrated accessory control system can be wholly or partially automated. For example, a user may be able to define an automated environment by operating a controller device to detect and pair with accessories that are to be included in the automated environment. The controller device can maintain an environment model (which can be a data structure representing the automated environment), and accessories included in the environment can be added to "rooms" within the model. Accessories can describe themselves to the controller, e.g., by providing a data object representing services the accessory supports. The controller that is updating the environment model can have information defining a minimum set of accessory services for a particular type of integrated accessory control system. In some embodiments, the minimum set can include a sensor capable of acting as an activator and an IP camera capable of streaming media to a controller. Additional services can be included in the minimum set; for instance, in the case of an integrated entry control system, the minimum set can include a doorbell or other activator, an IP camera, and a lock mechanism service. Regardless of the particular definition of the minimum set of accessory services, when the controller that is updating the environment model detects that accessories providing the minimum set of accessory services are present in a room of the model, the controller can automatically create an integrated accessory control system that includes these accessory services. Creating an integrated accessory control system can be done by creating a data object within the environment model that associates the accessories and services that are part of the system. In some instances, the controller can also have information defining an "includable" set of accessory services for the integrated accessory control system; the includable set can include services that, if available, can be added to the integrated accessory control system once it has been established. For instance, in the case of an integrated entry control system, the set of includable services can include a light service, an alarm service, an audio streaming service associated with an intercom, and so on. Once an integrated accessory control system has been established (based on the presence of the minimum set of services for that particular system), the controller can automatically add any includable services that happen to be present to the integrated accessory control system. In some embodiments, after the controller automatically creates an integrated accessory control system, the user can have the option to modify the system (e.g., by adding additional services to the system, removing services from the system, and/or deleting the system from the environment model).

In some embodiments, real-time video streaming from an IP camera (sending device) to a controller (receiving device) can be managed using a protocol that provides an efficient process for managing media streams, including setting up a streaming session and dynamically reconfiguring a video stream to manage image quality in the face of changing network conditions. The receiving device can monitor network conditions and determine when a bitrate adjustment is desired. In response to determining that a bitrate adjustment is desired, the receiving device can send a message to the sending device using the stream management protocol; the message can specify video parameters (e.g., image size and/or frame rate) that will result in the desired bitrate adjustment. In some embodiments, a relay device may relay media-stream packets between the sending device and the receiving device; the relay device can be, for instance, a coordinator that is on a local area network with the sending device and that communicates with the receiving device via a wide area network. The relay device can monitor conditions of the local area network and can send requests to adjust the bitrate to the receiving device and/or the sending device based on the local area network conditions.

The following detailed description together with the accompanying drawings will provide a better understanding of the nature and advantages of the present invention.

BRIEF DESCRIPTION OF THE DRAWINGS

FIG. 6 shows a table listing accessory services that can be provided by an IP camera accessory according to an embodiment of the present invention.

FIGS. 7A-7J show tables providing further definition of characteristics of a stream management service according to an embodiment of the present invention.

FIG. 8 shows a definition of a doorbell service according to an embodiment of the present invention.

FIG. 9 shows definitions of characteristics for the doorbell service of FIG. 8.

FIG. 10 shows a definition of a lock mechanism service according to an embodiment of the present invention.

FIG. 11 shows definitions of characteristics for the lock mechanism service of FIG. 10.

FIG. 12 shows a definition of a light service according to an embodiment of the present invention.

FIG. 13 shows definitions of characteristics for the light service of FIG. 12.

FIG. 14 shows definitions of services that can be included in an intercom accessory according to an embodiment of the present invention.

FIG. 15 shows definitions of characteristics for various services of FIG. 14.

DETAILED DESCRIPTION

Example Environment

Figure 1:
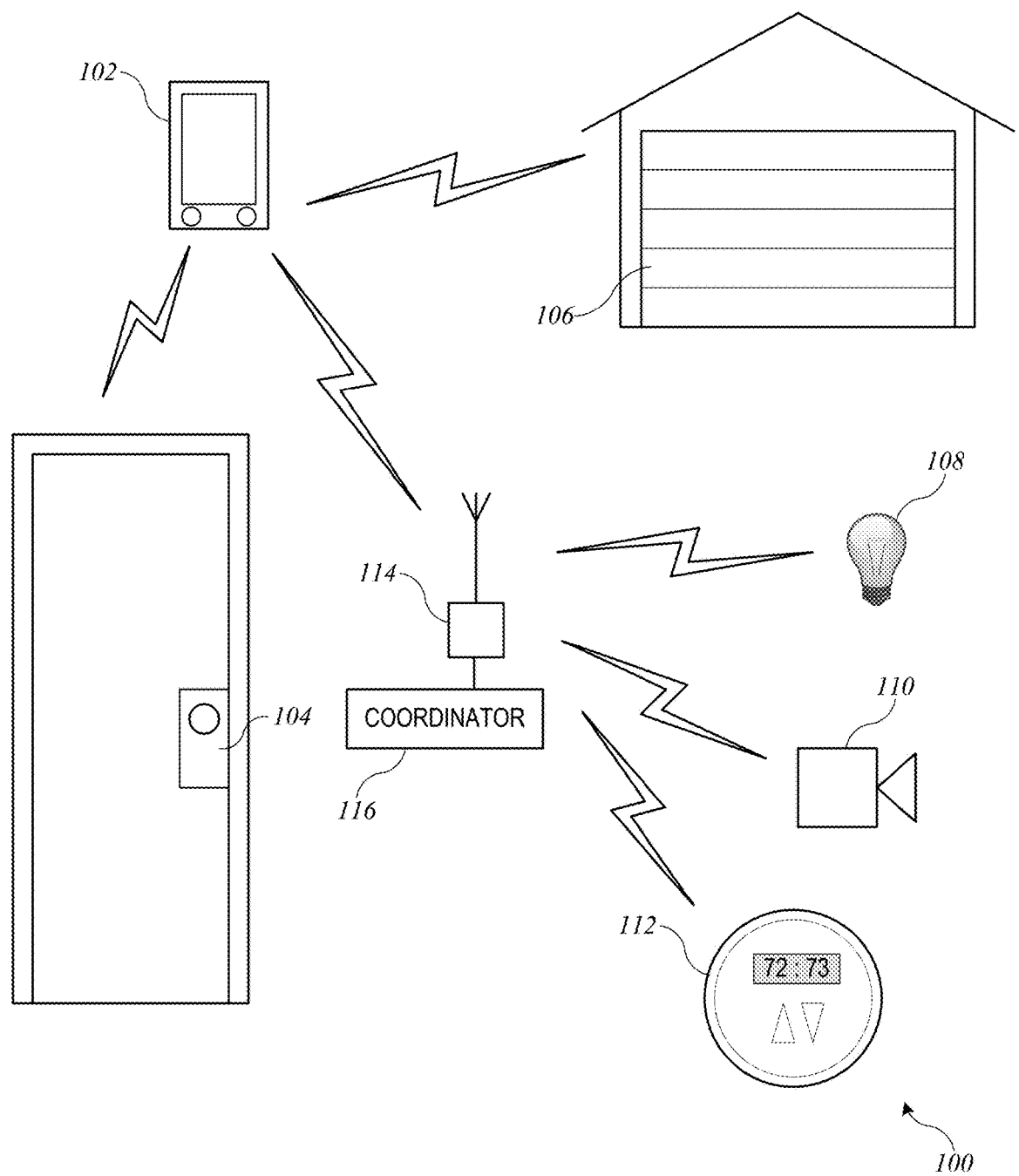
FIG. 1 shows a home environment according to an embodiment of the present invention.

FIG. 1 shows a home environment 100 according to an embodiment of the present invention. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in above-referenced U.S. application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or proxy as described below.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate via an intermediary. For instance, controller 102 is shown communicating via a wireless network access point 114 with accessories 108, 110, 112 that are on a wireless network provided by access point 114. As noted above, in some embodiments, controller 102 can include a base station, and base station functionality can be integrated into access point 114 or into one of the accessories that is to be controlled (e.g., thermostat 112). Another type of intermediary can be coordinator 116, which, in addition to operating as a controller, can relay messages between other controllers and accessories. In some embodiments, coordinator 116 can also implement various control logic to automate or optimize interactions with accessories; examples are described below.

Various communication transports and combinations of transports can be used, and different transports can be used with different devices. For example, some wireless transports such as the Bluetooth® Classic or Bluetooth® Smart communication protocol and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that routes communications between different devices on the network. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. As another example, coordinator 116 can be connected to access point 114 by a wired connection as shown (this connection can be wireless if desired), and controller 102 can communicate with accessories such as light bulb 108 by sending messages to coordinator 116 via access point 114; coordinator 116 can communicate with light bulb 108, either via access point 114 or via another channel such as a Bluetooth LE channel. Other combinations of wired and wireless communication are also possible.

Further, while one controller 102 is shown, a home environment can have multiple controller devices. For example, each person who lives in the home may have his or her own portable device (or devices) that can act as a controller for some or all of accessories 104-112. Different controller devices can be configured to communicate with different subsets of the accessories; for example, a child's controller might be blocked from modifying settings on thermostat 112, while a parent's controller device is permitted to modify the settings. Such permissions or privileges can be configured and controlled, for example, using techniques described below, and in above-referenced U.S. application Ser. No. 14/725,891.

In some embodiments, a uniform accessory protocol can facilitate communication by a controller 102 with one or more accessories 104-112. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. In some embodiments, message formats may be transport-dependent while conforming to the same accessory model. Examples of an accessory model based on services and characteristics are described in above-referenced U.S. application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages. The format can be the same across accessories. Examples of message formats are described in above-referenced U.S. application Ser. No. 14/614,914.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. application Ser. No. 14/614,914.

In some embodiments, communication with a given accessory can be limited to authorized controllers. The protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other, so that an established pairing can be persistent. After a pairing is established, controller 102 is considered authorized, and thereafter, controller 102 and accessory 104 can go in and out of communication as desired without losing the established pairing. When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. application Ser. No. 14/614,914.

In some embodiments, controllers (or their users) can be assigned various permissions or privileges in regard to the accessories. For example, an administrator (or "admin") privilege may be a highest level of privilege, and a controller with admin privileges may establish pairings with accessories and control any controllable characteristic of the accessory state. In some embodiments, admin privilege may be granted to the first controller to perform pair setup with a particular accessory, and after the admin controller performs pair setup, the accessory can decline to perform pair setup with any other controllers; instead, the admin controller can grant access to other controllers (or other users) by performing pair add. In some embodiments, the admin controller can specify privileges for each added controller (including admin privileges).

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. Any type of accessory device can be controlled, including but not limited to door locks, door openers, lighting fixtures or lighting systems, switches, power outlets, cameras, environmental control systems (e.g., thermostats and HVAC systems), kitchen appliances (e.g., refrigerator, microwave, stove, dishwasher), other household appliances (e.g., clothes washer, clothes dryer, vacuum cleaner), entertainment systems (e.g., TV, stereo system), windows, window shades, security systems (e.g., alarms), sensor systems, and so on. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive notifications of updates to) the service and/or its characteristics. Accordingly, protocols and communication processes used in embodiments of the invention can be uniformly applied in any context with one or more controllers and one or more accessories, regardless of accessory function or controller form factor or specific interfaces.

Figure 2:
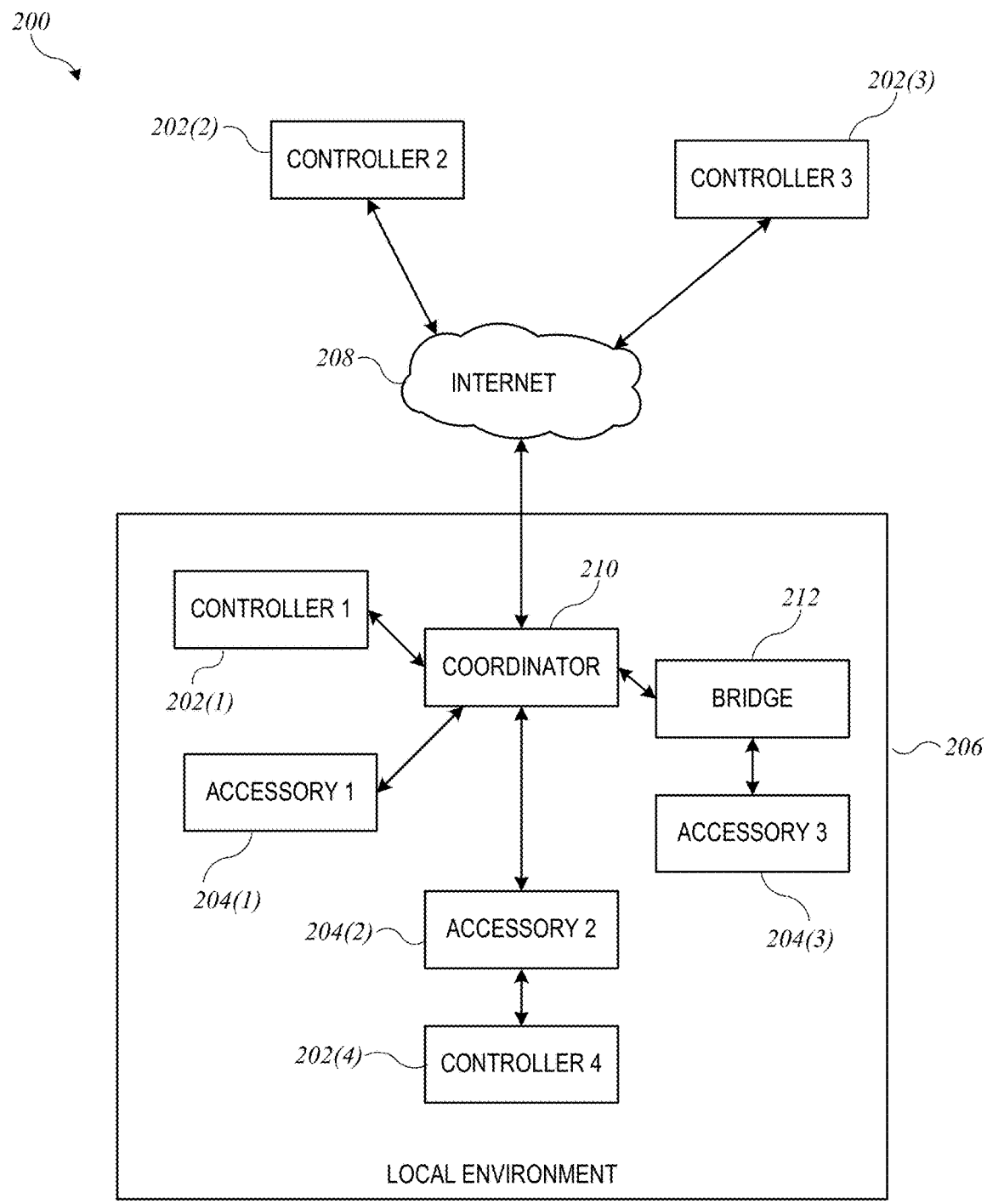
FIG. 2 shows a network configuration according to an embodiment of the present invention.

FIG. 2 shows a network configuration 200 according to an embodiment of the present invention. Configuration 200 allows controllers 202 to communicate with accessories 204 located in local environment 206 (e.g., a home environment) a via a coordinator 210. Each controller 202 can be an electronic device owned and/or operated by a user who frequents environment 206 (e.g., a resident of the home or a regular visitor to the home). Controllers 202 can each be similar to controller 102 of FIG. 1, and accessories 204 can be similar to various accessories shown in FIG. 1.

Accessories 204 can each communicate with a coordinator device (or "coordinator") 210 that can be located with local environment 206. As used herein, a "coordinator" can be an electronic device that is capable of operating as a controller of accessories 204 as well as relaying messages from other controllers (e.g., controllers 202) to accessories 204. In some embodiments, coordinator 210 can be an "intelligent" device that can coordinate operations among multiple controllers and/or accessories and is not limited to passively relaying messages. Coordinator 210 can include any device that is capable of presenting itself as a controller to accessories 204 and that is capable of communicating securely with controllers 202. In some embodiments, coordinator 210 can present itself to accessories 204 as a controller and to controllers 202 as an accessory that provides services for communicating with other accessories (e.g., accessories 204); examples are described in above-referenced U.S. application Ser. No. 14/725,891. In some embodiments, coordinator 210 can be a device that is expected to stay in local environment 206 and that is expected to be powered on and available for communication most or all the time. (It is to be understood that coordinator 210 can occasionally be unavailable, e.g., in connection with software or firmware upgrades, power outages, or other intermittent occurrences.) For example, coordinator 210 can be implemented in a desktop computer, a Wi-Fi or access-point unit, a dedicated accessory-control base station, a set-top box for a television or other appliance (which can implement coordinator functionality in addition to interacting with the television or other appliance), or any other electronic device as desired.

In some embodiments, coordinator 210 and accessories 204 can communicate using a local area network (LAN), such as a Wi-Fi network and/or a point-to-point communication medium such as Bluetooth LE. It is to be understood that other communication protocols can be used. In some embodiments, controllers 202, accessories 204, and coordinator 210 can support a uniform accessory protocol as described above that can be supported using both Wi-Fi and Bluetooth LE as transports.

In the example of FIG. 2, controllers 202(1) and 202(4) are currently located in local environment 206 with accessories 204 and coordinator 210. For example, controller 202(1) can be on the same LAN as accessories 204 and coordinator 210. Controllers 202(2) and 202(3) are currently located outside local environment 206 but are connected to a communication network 208 (e.g., the Internet); such controllers are said to be "remote" from accessories 204 and coordinator 210. It is to be understood that controllers 202 can be mobile devices that are sometimes within local environment 206 and sometimes outside local environment 206. Accessories 204 need not be mobile and need not be connected to communication network 208 (although they can be if desired). In some embodiments, coordinator 210 can be connected to communication network 208 and can facilitate access to accessories 204 by remote controllers 202(2) and 202(3).

In the example shown, controllers 202 can communicate with accessories 204 via coordinator 210, and coordinator 210 can be said to act as a "proxy" for accessories 204. Coordinator 210 can communicate directly with accessories 204(1) and 204(2). In the case of accessory 204(3), coordinator 210 can communicate via "bridge" 212. Bridge 212 can operate to relay commands between a controller and an accessory; in some embodiments, bridge 212 and/or coordinator 210 can also translate between different communication protocols used by coordinator 210 or controller 202 and accessory 204(3). Further, in some embodiments, bridge 212 can be implemented as a "tunnel" that can provide secure end-to-end communication between coordinator 210 and accessory 204(3). Examples of proxies, bridges, and tunnels are described in above-referenced U.S. application Ser. No. 14/725,891.

In some implementations of network configuration 200, controllers 202 can be configured to communicate with accessories 204 via coordinator 210 whenever possible. Thus, as shown, controller 202(1), which is in local environment 206, communicates with coordinator 210 rather than directly with accessories 204, as do remotely located controllers 202(2) and 202(3). Direct communication between any of controllers 202 and accessories 204 can be limited, e.g., to situations where coordinator 210 is not available. In other embodiments, controllers 202 may communicate directly with accessories 204 whenever they happen to be in range of each other (e.g., on the same Wi-Fi network or within Bluetooth range). For instance, as shown, controller 202(4) can communicate directly with accessory 204(2).

In some embodiments, coordinator 210 can be used to coordinate access by multiple controllers 202 to multiple accessories 204. For example, rather than establishing a pairing between each controller 202 and each accessory 204, controllers 202 can each establish a pairing with coordinator 210, and coordinator 210 can establish a pairing with each accessory 204. The same pair setup and/or pair add processes used to establish a controller-accessory pairing can also be used to establish a controller-coordinator pairing, with the coordinator acting in the role of accessory. For purposes of coordinator-accessory pairing, the coordinator can assume the role of controller. Thus, coordinator 210 can present itself as an accessory when communicating with a controller (e.g., any of controllers 202) and as a controller when communicating with an accessory (e.g., accessory 204).

Coordinator 210 can facilitate operation of an accessory network including accessories 204. For example, coordinator 210 can maintain an environment model for the accessory network and can provide the model (or portions thereof) to various controllers 202; examples of an environment model are described below. Controllers 202 can operate accessories 204 by interacting with coordinator 210.

In some embodiments, coordinator 210 can manage permissions associated with the accessory network or environment model to limit access by specific controllers 202 to some or all accessories 204. In some embodiments, controllers 202 can preferentially route all requests to accessories 204 through coordinator 210, and in some embodiments, accessories 204 can be configured to communicate directly only with coordinator 210 and to ignore requests that come directly from controllers 202. This can allow coordinator 210 to enforce permissions and other restrictions on access to accessories 204.

Centralizing communication with accessories through coordinator 210 can simplify management of a controller network and/or accessory network (e.g., controllers 202 and accessories 204 in local environment 206). For example, if a new accessory is acquired, the new accessory need only establish a pairing with coordinator 210 in order to allow all controllers 202 to have access to the new accessory. Similarly, if a new controller 202 is acquired, the new controller 202 need only establish a pairing with coordinator 210 to allow the new controller to have access to all accessories 204. In an environment with multiple controllers (e.g., a family where the members each have multiple devices) and perhaps dozens of accessories, the time saving can be considerable.

It should be noted that in configuration 200, it is possible that one or more of the controllers (e.g., controller 202(1)) can be permitted to communicate with one or more accessories (e.g., accessory 204(1)) indirectly (via coordinator 210) but not directly, regardless of whether controller 202(1) is in local environment 206. This might occur, for instance, if controller 202(1) has established a pairing with coordinator 210 but not directly with accessory 204(1). In some instances, this can provide enhanced security; for instance, an accessory that has a pairing established with coordinator 210 can refuse to establish any other pairings. However, there may be cases where direct access is desirable, and establishing a direct pairing between a certain accessory, e.g., accessory 204(1) and one or more controllers 202 can be permitted. For example, suppose that accessory 204(1) is a door lock and controller 202(1) is a mobile phone. If a direct pairing between accessory 204(1) and controller 202 (1) is established, a user can use controller 202(1) to lock or unlock accessory 204(1) via direct communication, thereby locking or unlocking the door. This can be useful, e.g., in the event that coordinator 210 is temporarily unavailable. In some embodiments, coordinator 210 can be used to indicate to accessory 204(1) which of controllers 202 are authorized for direct access, and accessory 204(1) can establish pairings with authorized controllers 202. In some embodiments, accessory 204(1) can be configured to accept direct communication from an authorized controller 202 only when coordinator 210 is not available. Thus, the general rule can be that all communications with accessory 204 go through coordinator 210, with exceptions made on a per-accessory and per-controller basis.

Coordinator 210 can operate as an intelligent agent for allowing controllers to operate accessories, rather than simply relaying messages. For example, coordinator 210 can establish a pairing with each of controllers 202 and a pairing with each accessory 204. When controller 202(1), for example, receives a user request to interact with a specific accessory, e.g., accessory 204(1), controller 202(1) can establish a first pair-verified session with coordinator 210 and provide its instructions for accessory 204 to coordinator 210 via the first pair-verified session. Coordinator 210 can receive the instructions, establish a second pair-verified session with accessory 204 and send appropriate control messages to accessory 204 via the second pair-verified session. In some embodiments, coordinator 210 can be privy to the content of the instructions, and in some embodiments, the messages sent to accessory 204 need not correspond to the instructions provided by controller 202(1). For example, while communicating with controller 202(1), coordinator 210 may also be in communication with another controller (e.g., controller 202(2)). Controllers 202(1) and 202(2) may each provide instructions for accessory 204 to coordinator 210. Coordinator 210 can analyze the received instructions, e.g., to detect and resolve conflicts such as where controller 202(1) instructs coordinator 210 to turn accessory 204 on while controller 202(2) instructs coordinator 210 to turn accessory 204 off. Coordinator 210 can be programmed with priority rules or other rules for resolving conflicts (e.g., "on" takes priority over "off"; instructions from a controller with admin privilege take precedence over instructions from a controller without admin privilege; etc.). Coordinator 210 can apply the priority rules to resolve any conflicts and can communicate instructions to accessory 204 based on the resolution. When a response is received from accessory 204, coordinator 210 can determine whether to send a corresponding message (or a different message) to controller 202(1) and/or to controller 202(2). As another example, coordinator 210 can enforce permissions established for various controllers 202 and/or accessories 204. For example, when one of controllers 202 sends a request, coordinator 210 can apply decision logic to determine whether the controller 202 that sent the request has appropriate permission; if not, coordinator 210 can reject the request. The decision logic can be as simple or complex as desired; for instance, a controller belonging to a child may be limited as to which hours of the day or for how long it can operate a particular accessory (e.g., a TV) while a parent's controller can have unlimited access, or a controller associated with a guest (e.g., a babysitter) may be restricted to operating a certain subset of the accessories. Thus, coordinator 210 is not limited to acting as a passive relay for messages between controllers and accessories but can actively intervene to resolve conflicting instructions, enforce any limitations that may exist on the privileges or permissions granted to particular controllers or users, and so on.

It will be appreciated that network configuration 200 is illustrative and that variations and modifications are possible. Any number of controllers and any number of accessories can be included in a network configuration. In some embodiments, coordinator 210 can be replaced with a proxy that relays messages between controllers and accessories without necessarily reading the content of the messages. In some embodiments, coordinator 210 can be omitted entirely. Some or all of accessories 204 may be accessible only within the local environment. Further, as described below, different controllers 202 may have different levels of permission in regard to accessing accessories 204; for instance, remote access via network 208 may be permitted for some controllers 202 but not for other controllers 202.

As noted above, coordinator 210 can be particularly useful in the context of an automated environment with a number of accessories that can be controlled. Examples include homes, cars or other vehicles, office buildings, campuses having multiple buildings, etc. For purposes of illustration, an example of an accessory network implementation for a home will be described; those skilled in the art with access to the present disclosure will understand that similar accessory networks can be implemented in other automated environments.

In one example of an accessory network, each accessory is connected to one or more controllers, and accessories can be controlled by sending messages, e.g., as described in above-referenced U.S. application Ser. No. 14/725,912 and U.S. application Ser. No. 14/614,914. This can be perfectly serviceable for small networks with just a few accessories. However, in some instances, particularly as the number of accessories increases, it can be helpful to establish meaningful (to a user) groups of accessories that can be managed in a coordinated fashion. Accordingly, certain embodiments of the present invention incorporate environment models usable to coordinate control across multiple accessories in an accessory network.

As used herein, an environment model can provide various logical groupings of the accessories in an environment. For example, a home environment can be modeled by defining "rooms" that can represent rooms in the home (e.g., kitchen, living room, master bedroom, etc.). In some cases, a room in the model need not correspond to a room in the home; for instance, there can be a "front yard" room or an "anywhere" room (which can be used to refer to accessories that are present in the home but whose location within the home is subject to change or has not been defined as a room). Each accessory in the home can be assigned to a room in the environment model, e.g., based on the actual physical location of the accessory. Rooms can be grouped into zones based on physical and/or logical similarities. For instance, an environment model for a two-level house might have an "upstairs" zone and a "downstairs" zone. As another example, an environment model might have a "bedrooms" zone that includes all bedrooms regardless of where they are located. The model can be as simple or complex as desired, e.g., depending on the size and complexity of the environment.

Where an environment model is defined, accessories represented in the environment model can be controlled individually or at the level of rooms, zones, or the whole model. For instance, a user can instruct a controller or coordinator to turn on all the outside lights or to turn off all accessories in a specific room.

Other groupings of accessories can also be defined. For example, in some embodiments, a user can augment an environment model by grouping various accessories into "service groups" that can include any set of accessories the user may desire to control together, at least some of the time. A service group can include accessories in any combination of rooms or zones, and the accessories in a service group can be homogeneous (e.g., all upstairs lights) or heterogeneous (e.g., a light, a fan, and a TV). In some embodiments, a user can provide a single instruction to a controller to set the state of an entire service group (e.g., turn the group on or off). While not required, the use of service groups can provide another degree of flexibility in coordinating control over multiple accessories.

Some embodiments may also provide "triggered action sets," or "triggers," that can be defined and automatically executed by a controller or coordinator. A triggered action set can define a set of actions to be taken upon occurrence of certain events or conditions. In some embodiments, execution of a triggered action set (also referred to as "executing a trigger") can occur in stages. At a first stage, a "triggering event" is detected at a controller (e.g., any of controllers 202 described above) or a coordinator (e.g., coordinator 210 described above). In response to detecting the triggering event, the controller 202 (or coordinator 210) that detects the event can test whether a "triggering condition" is satisfied. If so, then one or more "resulting actions" can be performed. Accordingly, a trigger can be defined by specifying a triggering event, a triggering condition, and one or more resulting actions. A trigger can be defined based on user input and/or automated processes in controller 202 or coordinator 210. The triggering event can correspond to any occurrence that is detectable by a controller or coordinator. For instance, occurrences at an accessory can be detected by the accessory and reported to a controller or coordinator using the notification mechanism of the uniform accessory protocol, thereby making the occurrence at the accessory detectable by the controller or coordinator. Other examples of triggering events can include devices entering or leaving a geofence or other defined area, weather events (e.g., temperature changes, wind speed changes, rain starting or ending, sunrise, sunset, seismic activity, etc.), time and/or date, activity of an application program executing on a device, communication events (e.g., placing or receiving a phone call), and so on. The triggering condition can correspond to any condition that can be tested by a controller or coordinator. Examples can include whether a particular user or user device is in the local environment, whether an accessory or controller is in a particular state (e.g., powered on, in active use, connected to a charger, etc.), and so on. The resulting action(s) can include any action that a controller or coordinator can initiate. Examples can include sending a message to an accessory to determine or change its state, sending a notification to a user or to another controller, launching an application program on a controller or other user device, and so on. In some embodiments described below, a trigger can be used to initiate a notification to a controller in response to detecting some physical activity (e.g., motion, doorbell activation) by an accessory capable of detecting the activity.

In some embodiments, the environment model for a given environment can be represented as a data object (or set of data objects). The environment model can be created on a controller associated with the environment (e.g., a controller with admin privileges) and can be shared with other controllers through a synchronization operation. For instance, controllers 202 of FIG. 2 can synchronize with a "master" copy of the environment model maintained by coordinator 210 (which can receive updates from controllers 202), or cloud-based synchronization (in which the master copy is stored in a location accessible via network 208 and automatically synchronized with the controllers and coordinator(s) associated with the environment) can be used. Accordingly, all controllers and coordinators associated with a given environment can have shared access to the same environment model.

Additional examples related to defining and using an environment model are described in above-referenced U.S. application Ser. No. 14/725,912. It is to be understood that an environment model is not required to make use of at least some of the features described below.

Integrated Accessory Control System

Certain embodiments of the present invention relate to systems and methods for providing integrated accessory control systems for an automated environment. Integrated accessory control can be provided by using a controller or coordinator to manage the operations of multiple disparate accessories that together may allow a user operating a controller associated with the environment (who might or might not be physically present in the environment) to obtain information about the environment, make decisions based on the information, and control accessories in the environment based on those decisions.

For purposes of illustration, a specific example of an integrated accessory control system will be described in detail. The example used herein is an integrated entry control system that allows a user operating a controller to determine that someone is seeking to enter the environment, identify the person seeking entry, communicate with the person, and/or grant entry.

Figure 3:
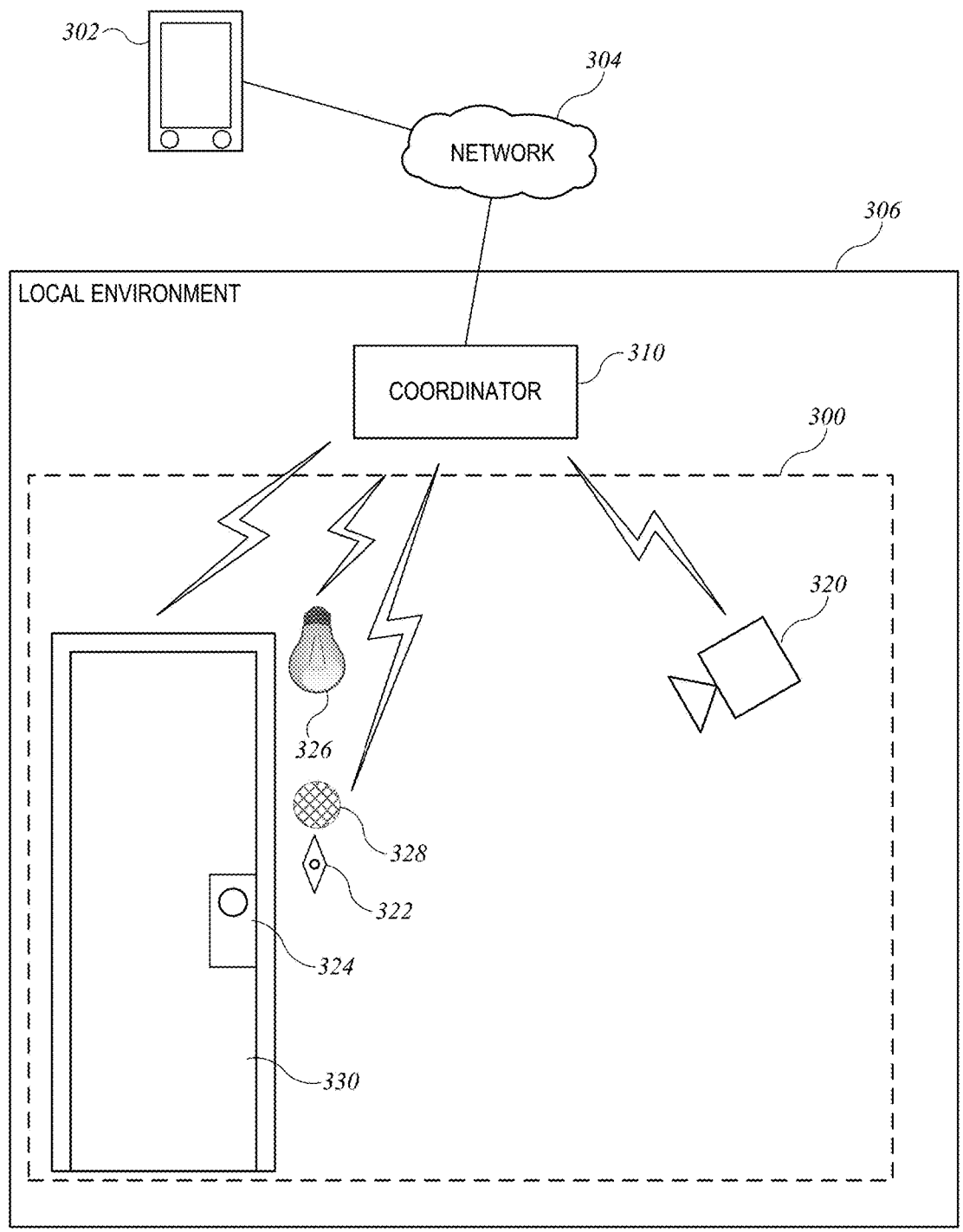
FIG. 3 shows an example of an integrated entry control system according to an embodiment of the present invention.

FIG. 3 shows an example of an integrated entry control system 300 according to an embodiment of the present invention. Integrated entry control system 300 can be located within a local environment 306 and can communicate with a controller 302 that is associated with, but remote from, local environment 306. Local environment 306 can include a coordinator 310, and controller 302 can communicate with coordinator 310 via a wide-area network 304, which can be, e.g., the internet. Controller 302, coordinator 310, and local environment 306 generally similar to controllers, coordinators, and local environments described above.

Local environment 306 can include any number of accessories (accessory devices or accessory services). In this example, five accessories participate in integrated entry control system 300: IP camera 320, doorbell 322, door lock 324, porch light 326, and intercom 328. Each of these accessories can be independently operable devices that may be made by the same manufacturer or different manufacturer as desired, and, as will become apparent, integrated entry control system 300 can be operated without accessories 320-328 communicating with each other or even being aware of each other's existence. It is assumed that each of accessories 320-328 implements a uniform accessory protocol as described above and that their various functionalities are modeled as services that can be controlled by reading and writing to characteristic instances of the various services. In some embodiments, some or all of accessories 320-328 can be packaged together and provided as a single device that provides instances of multiple accessory services. As long as the various accessory services that support the functionality and operations described herein are present, the physical configuration can be modified without limitation.

IP camera 320 can include a camera capable of capturing video images (with or without audio) and streaming captured media (audio and/or video) to other devices. Accordingly, IP camera 320 may provide a "media streaming" service with various characteristics that can be used to set up the camera and control its behavior (e.g., aiming the camera, starting and stopping recording, etc.). The actual streaming need not be provided through the uniform accessory protocol; instead, streaming can conform to a different protocol, such as the RTP protocol (e.g., as defined in IETF RFC 3550) with the SRTP protocol (e.g., as defined in IETF RFC 3711) used for media security. Other media streaming protocols can be substituted, as will be apparent. The uniform accessory protocol can define characteristics usable to establish a streaming session that supports a streaming protocol, and delivery of streamed content can take place via the streaming session. In some instances, IP camera 320 can also provide other functionality, such as recording and/or playback of previously recorded content, and such functionality can be exposed to controllers (including controller 302 and coordinator 310) as services conforming to the uniform accessory protocol. Specific examples of accessory services that can be provided by IP camera 320 are described below.

Doorbell 322 can include a conventional doorbell mechanism that generates a sound when the doorbell is pressed. In addition or instead, doorbell 302 can provide a "doorbell" accessory service conforming to the uniform accessory protocol. Characteristics of the doorbell accessory service can include an activation indicator, and controllers (e.g., controller 302 and/or coordinator 310) can subscribe (or register) to receive notifications when the activation indicator changes to an active state. When doorbell 322 is pressed, the activation indicator can change to the active state, and doorbell 322 can send notifications to any controller that has subscribed to receive them.

Door lock 324 can include an electronic locking unit coupled to a door lock that can be installed on a door. In some embodiments, the door lock itself can be a mechanical lock (e.g., deadbolt type), and the electronic locking unit can operate electromechanical actuators to move the mechanical lock between locked and unlocked positions. Position sensors or the like can also be provided to allow the electronic locking unit to determine whether the mechanical lock is currently in the locked or unlocked position. In other embodiments, other types of door locks can be used, e.g., magnetic locks, electronic locks, or any other type of lock that can be locked and unlocked by supplying electrical control signals and/or applying mechanical forces. The electronic locking unit can house or be connected to logic circuitry to implement a uniform accessory protocol as described above and communication circuitry to communicate with one or more controllers. The electronic locking unit can generate electrical signals (e.g., voltage or current levels on one or more wires) to operate the door lock, e.g., via electromechanical actuators or the like. In some embodiments, the electronic locking unit and the door lock can be physically located within a common housing, such as a module that attaches to the door, or inside the door or door frame. In other embodiments, the electronic locking unit and the door lock can be in separate housings. For instance, the door lock can be inside the door while the electronic locking unit is mounted on a nearby wall. Wired connections between actuators in the door lock and electronic locking unit can be provided. Wireless connections can also be used without departing from the scope of the present invention, although those skilled in the art will appreciate that a wireless connection in this context may raise additional security concerns.

To allow controllers to lock or unlock the door, door lock 324 can provide a "lock mechanism" accessory service conforming to the uniform accessory protocol. Characteristics of the lock mechanism accessory service can include a current state of the lock (e.g., locked or unlocked) and a target state of the lock (e.g., locked or unlocked). A controller can determine the current state of the lock by reading the current-state characteristic of the lock mechanism service and can lock or unlock the door by writing a value indicating the desired state to the target-state characteristic. In some embodiments, door lock 324 can also provide other accessory services as desired.

Porch light 326 can include a light that can be turned on or off. In some embodiments, adjustments to properties of the light (e.g., brightness and/or color of the light) may be provided. In some embodiments, porch light 326 may be physically connected to a light switch, allowing a person to manually control the light. To allow controllers to control the light, porch light 326 can provide a "light" accessory service conforming to the uniform accessory protocol. Characteristics of the light service can include a current state of the light (e.g., on or off) and a target state of the light (e.g., on or off). A controller can determine the current state of the light by reading the current-state characteristic of the light service and can turn the light on or off by writing a value indicating the desired state to the target-state characteristic. In some embodiments where properties of the light are adjustable, the light service can include other characteristics corresponding to the adjustable properties.

Intercom 328 can support audio communication between a person at door 330 and the operator of controller 302. Intercom 328 can include a microphone, allowing the operator of controller 302 to hear the person at door 330, and/or a speaker, allowing the operator of controller 302 to speak to the person at door 330. To allow controllers to operate the microphone and/or speaker, intercom 328 can provide a "microphone" accessory service and/or a "speaker" accessory service conforming to the uniform accessory protocol; either or both services can be provided depending on the direction(s) of audio communication to be supported. In some embodiments, each microphone and speaker service can include characteristics such as mute (whether the device is active) and/or volume (to control the amplification of the sound).

It is to be understood that integrated entry control system 300 is not limited a particular set of accessories (or accessory services). For example, integrated entry control system 300 may also include an alarm device that is triggered by forced or unauthorized opening of door 330; when triggered, the alarm device can generate visual and/or audible alarms, send an alarm message to one or more controllers (e.g., coordinator 310 and/or controller 302), and/or notify third-party monitoring services (which can include private services and/or law enforcement agencies). Further, not all of the accessories are required; for instance, some embodiments of an integrated entry control system may have just a doorbell, a door lock, and an IP camera. The various accessories can be separately packaged or integrated into a single housing as desired; for instance, an intercom and a doorbell, or an IP camera and an intercom, might be in a single housing, which can facilitate installation.

Operation of accessories 320-328 can be coordinated, e.g., by coordinator 310 and/or controller 302, to provide an integrated entry control system that is accessible to a remote user (e.g., the user of controller 302). For example, suppose that door lock accessory 324 is installed on door 330. Doorbell accessory 322 can be positioned adjacent to door 330, such that it is manually operable by a person seeking entry through door 330. Porch light accessory 326 can be positioned such that its light illuminates the area around door 330. IP camera accessory 320 can be positioned such that it can capture images of a person in front of door 330 who may be operating doorbell accessory 322.

In some embodiments, coordinator 310 and/or controller 302 can subscribe to receive notifications from doorbell 322 when the activation indicator of doorbell 322 changes to an active state. In response to receiving a notification, controller 302 or coordinator 310 can instruct IP camera 320 to capture and send at least one image. If coordinator 310 receives the notification from doorbell 322, coordinator 310 can generate a notification to remote controller 302, allowing the user of controller 302 to receive an alert (or notification) indicating that someone is at door 330; in some embodiments, the alert presented to the user can include the image captured and sent by IP camera 320. The user can then choose an action to take.

Figure 4:
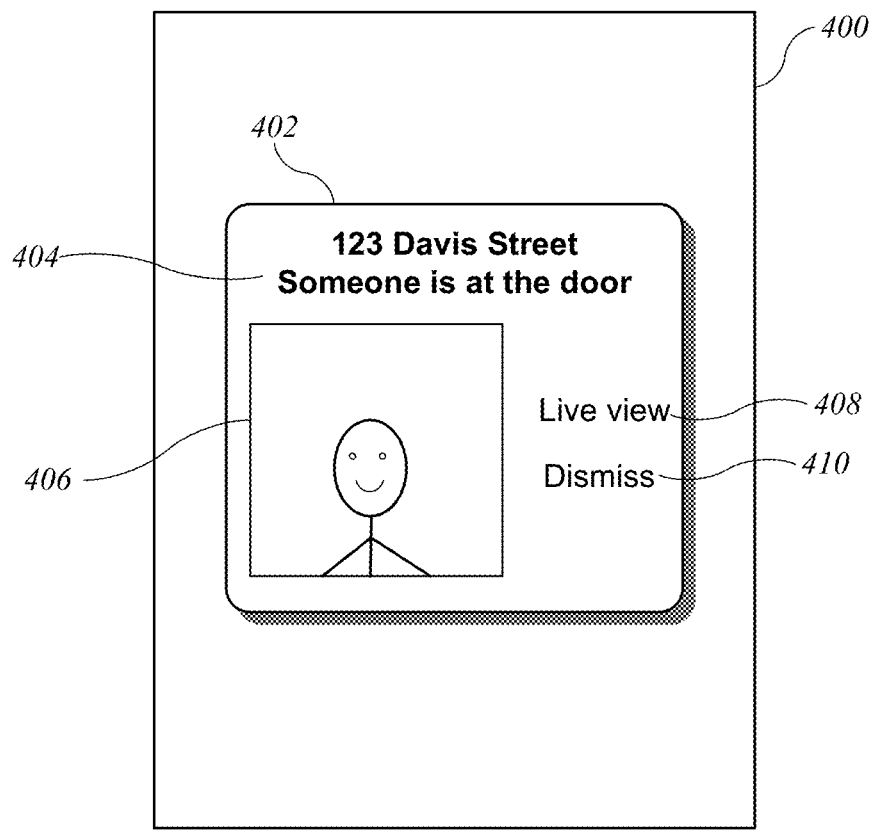
FIG. 4 shows a screen image that can be displayed on a controller according to an embodiment of the present invention.

For instance, FIG. 4 shows a screen image 400 that can be displayed on controller 302 according to an embodiment of the present invention. Screen image 400 can include an alert window 402 that can be generated by controller 302 in response to receiving a notification that someone is at door 330. In some embodiments, alert window 402 can be a pop-up message that appears over the top of any image or content that controller 302 may have been displaying when the notification was received. Alert window 402 can include explanatory text 404 that describes the nature of the notification (e.g., an identifier of the particular automated environment to which the notification pertains (which can be a user-assigned name, such as "123 Davis Street" or "My House") and an indicator of the specific notification). Image 406 can be included if controller 302 obtained an image from IP camera 320 (either directly or via coordinator 310). In some cases, this may provide enough information for the user to determine who is at the door. Notification window 402 can also include user-operable control elements (e.g., graphical user interface elements rendered on a touch-screen display) to allow the user to interact with the notification. For example the user can select "Live view" element 408 to access a live view or "Dismiss" element 410 to close notification window 402.

Figure 5:
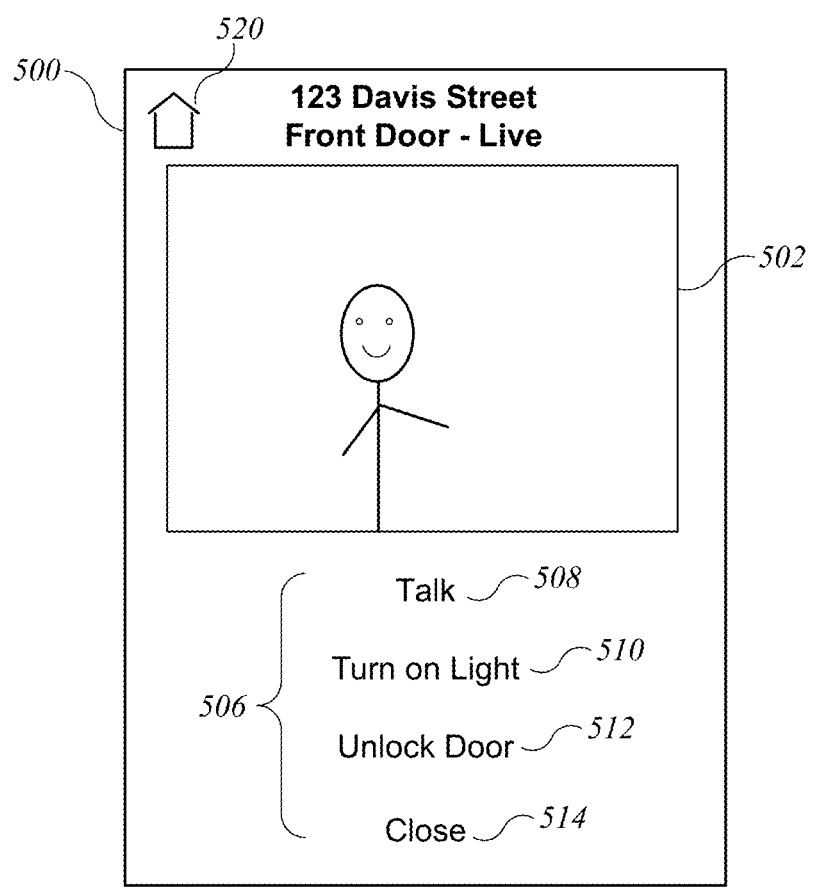
FIG. 5 shows another screen image that that can be displayed on a controller according to an embodiment of the present invention.

FIG. 5 shows a screen image 500 that that can be displayed on controller 302 according to an embodiment of the present invention. Screen image 500 can be displayed, e.g., in response to the user selecting "Live view" element 408 from notification window 402 of FIG. 4. Screen image 500 can include a live (streamed) video image from IP camera 320, as well as user-operable control elements 506 (e.g., graphical user interface elements rendered on a touch-screen display) to allow the user to interact with integrated entry control system 300. The particular control elements can depend on which accessories (or accessory services) have been included in integrated entry control system 300. For example, if integrated entry control system 300 includes intercom 328, the user can select "Talk" element 508 to activate intercom 328, allowing the user to talk to (and/or listen to) a person at the door. The user can select "Turn on Light" element 510 to turn on light 326; this may help the user see the person at the door more clearly, or help the person at the door see more clearly. In some embodiments, if the user select "Turn on Light" element 510, the element can change to a "Turn off Light" element. Alternatively, a slider, virtual switch, or other control element can be provided to allow the user to control light 326. The user can select "Unlock door" element 512 to unlock door lock 324. The user can select "Close" element 514 to end the interaction, which can result in screen image 500 being replaced with whatever image or content was being displayed at the time notification window 402 was presented. In some embodiments, screen image 500 can continue to be displayed until the user selects "Close" element 514. Screen image 500 can also include other control elements, such as "home" element 520, which the user can select to access a home-control application, allowing the user to interact with accessories that are not part of integrated entry control system 300.

It is to be understood that the user interfaces shown in FIGS. 4 and 5 are illustrative and that modifications and alternative interfaces can be implemented. The size and/or complexity of the interface screens can depend on the size of the display on which the interface is being presented, on rendering capabilities of the user interface device, and/or other considerations (including esthetics and ease of operation). For example, the initial notification need not include a live image; a live feed or no image can be provided as desired. In some embodiments, the initial notification interface can include a user-operable control element (also referred to as an affordance) to allow the user to unlock the door or perform other accessory control operations as desired. Interface screen 500 can include user-operable controls for any accessory associated with integrated entry control system 300 (e.g., an option to disarm an alarm system so that it will not be triggered by opening of door 330, a volume control for intercom) and can omit controls for accessories that are not present (e.g., if an integrated entry control system does not include a light, then "Turn on Light" element 510 can be omitted).

User interfaces similar to the examples shown can be provided for any type of integrated accessory control systems. Such user interfaces can include an initial notification that the activator accessory (e.g., doorbell, motion sensor, or other sensor) has been activated, which can be similar to screen image 400. The notification can indicate the specific activator event that occurred and/or the associated integrated accessory control system that has been activated and can provide various options for interacting with the integrated accessory control system associated with the activator accessory. The initial notification can but need not include a still image (or, if desired, a live video feed) from an IP camera of the integrated accessory control system. The options included in the initial notification can include an option to access a more complete interface for the integrated accessory control system, which can be similar to interface screen 500. Options presented in the initial notification and/or the more complete interface can include, e.g., viewing or recording a live feed from an IP camera of the integrated accessory control system, viewing or saving a still image from the IP camera, locking or unlocking doors, turning on or off lights, arming or disarming alarm systems (or components thereof), or performing any other operation of any accessory that may be included in the integrated accessory control system. Additional examples of user interface screens that may be presented for an integrated accessory control system are described in above-referenced U.S. Provisional application Ser. No. 62/349,043.

Example Accessory Services for Integrated Entry Control System

In some embodiments, interaction between integrated entry control system 300 and a user of controller 302 can be provided by modeling accessories 320-328 as collections of services that are associated into an integrated entry control system. Examples of accessory services implementing accessories 320-328 will now be described.

FIG. 6 shows a table 600 listing accessory services that can be provided by IP camera 320 according to an embodiment of the present invention. Each service represents a function that an accessory can implement and is defined by reference to a set of required characteristics ("Required Ch." property in FIG. 6) and a set of optional characteristics ("Optional Ch." property in FIG. 6). In addition to the characteristics shown, each service can have an optional "name" characteristic (the name) and/or other characteristics as desired. For present purposes, a characteristic is defined as "required" for a given service in instances where any compliant accessory that claims to provide that service is expected to recognize and use the "required" characteristic to control the accessory. A characteristic is defined as "optional" for a given service in instances where the accessory is not required to include the characteristic in its service definition but may do so.

RTP stream management service 602 can support configuration and operation of media streams conforming to the RTP protocol as defined above. Required characteristics can include characteristics that allow a controller to obtain information about supported video streaming configurations as well as to configure a stream and to start and stop streaming. In this example, support for video streaming is required; support for audio streaming is optional and can be provided if the video streaming source can also provide an audio stream (e.g., an IP camera with an integrated or attached microphone to pick up sounds). Characteristics of RTP stream management service 602 are described below with reference to FIGS. 7A-7J.

Camera control service 604 can support control of the operating parameters of an IP camera. All characteristics can be optional, depending on the features available in a particular IP camera. The characteristics shown may have both read and write permissions; a paired controller can read the characteristic to determine its current state and write to the characteristic to change the state.

For a camera with panning capability, the horizontal (vertical) tilt characteristic can be used to control the horizontal (vertical) panning of the camera. In some embodiments, the value of the horizontal (vertical) tilt characteristic can be defined as a range of motion, from −90 degrees to plus 90 degrees. In some embodiments, rather than a single characteristic with read and write permissions, there may be a readable characteristic for determining the current (horizontal or vertical) tilt and a writeable characteristic for specifying a target (horizontal or vertical) tilt.

For a camera with zoom capability, the optical zoom and/or digital zoom characteristics can be used to control optical and/or digital zooming. In some embodiments, the value of the characteristic can be a floating-point value representing the desired setting (e.g., a multiplier).

For a camera with image rotation capability, the image rotation characteristic can be used to specify a rotation to be applied to the image by the camera (e.g., 0 to 359 degrees). In some embodiments, rotation can be quantized (e.g., to multiples of 90 degrees).

For a camera with image mirroring capability, the image mirroring characteristic can be used to control whether the image is or is not mirrored by the camera.

For a camera with night vision capability, the night vision characteristic can be used to indicate whether the night vision mode is enabled or disabled.

In some embodiments, camera control service 604 can provide other characteristics. For instance, camera control service 604 may have an "On" characteristic that allows the service to be turned on or off. Depending on implementation, turning camera control service 604 off may place the camera in a low-power state and end any streaming that may be in progress. In some embodiments, a camera accessory with camera control service 604 can be used only when the "On" characteristic is set to its "on" state. It is to be understood that any controllable property or function of a specific camera can be controlled by defining one or more corresponding characteristics and including those characteristics in a service instance corresponding to that specific camera.

FIGS. 7A-7J show tables providing further definition of characteristics of RTP stream management service 602 according to an embodiment of the present invention. In FIG. 7A, table 700 lists example characteristics. As shown, each characteristic can have a "type," can be a unique name or identifier assigned to that characteristic (e.g., a character string). In this example, a reverse domain name convention is used to assign types, which can facilitate definition of extension characteristics by accessory manufacturers. Other identifiers, such as UUIDs or other numerical identifiers, can be assigned in addition to or instead of strings. Each characteristic can have various permissions, which indicate the manner in which a controller is allowed to interact with the characteristic. Permissions used in the present examples include "Read" (permission to interrogate the current value of the characteristic), "Write" (permission to modify the value of the characteristic), and "Notify" (permission to subscribe, or register, to receive notifications when the value of the characteristic changes). The permissions are qualified as "Paired" to signify that the interaction can only be performed by a controller that has an established pairing with the accessory; a pairing can be established, e.g., using pair setup or pair add processes as defined above. It is to be understood that other permissions may be defined.

FIG. 7A also shows a format for the value of the characteristic. As used herein, <boolean> format indicates that the characteristic takes values of true and false; <int> format indicates that the characteristic takes a signed integer value; <float> indicates that the characteristic takes a signed floating-point value; <string> indicates that the characteristic takes a character string value e.g., using UTF-8 encoding). The <enum> format indicates that the characteristic takes one of a defined set of values representing specific conditions, and the possible values are listed as "valid values" for that characteristic. In some embodiments, an enumerated value format can be implemented by assigning a different integer to each valid value. The <object> format indicates that the value is a structured data object, which can be represented using a key-value format, a type-length-value (TLV) format, or the like. In some instances, the format may be an array, which can be a fixed-length or variable-length array of values in any of the other formats. It is to be understood that this list of formats is not intended as exhaustive.

Streaming status characteristic 702 can be used to determine whether the camera is currently streaming media. Different integer values can be mapped to different states, such as "available" (not in use and able to stream), "unavailable" (not able to stream), or "in use" (currently streaming to a destination device).

Supported video configuration characteristic 704 can be used to describe supported parameters for streaming video over an RTP session. An IP camera can support any number of video-streaming configurations. Each supported configuration can be represented as a data object, and the value of characteristic 704 can be an array with one data object per supported configuration. FIG. 7B shows elements of an example video configuration data object expressed in key-value form. Video-codec-type 722 can have an integer value that maps to one of a set of supported codec types (e.g., H.264 codec as defined in IETF RFC 6184 and/or other types). Video-codec-params 724 can be a data object whose structure depends on the codec type identified by video-codec-type 722. FIG. 7C shows elements of an example video-codec-params data object 724 (expressed in key-value form) for an H.264 codec. Profile ID 731 can have an integer value that maps to one of a set of H.264 profile types (e.g., constrained baseline, main profile, high profile, etc.). Support level 732 can have an integer value that maps to a support level for the profile. Packetization mode 733 can have an integer value indicating the packetization mode being used (e.g., non-interleaved or various interleaving schemes). CVO-enabled 734 can have a boolean value indicating whether the coordination of video orientation (CVO) extension to RTP (as documented in 3GPP TS 26.114) is enabled for this video configuration, and if CVO-enabled 734 has the value "true," CVO-ID 735 can have an integer value providing the ID for the CVO RTP extension (e.g., a value in the range from 1 to 14).

Referring again to FIG. 7B, the video configuration data object can also include a video-attributes data object 726. This data object can include values defining image width and height (in pixels) and a maximum frame rate supported by the video configuration.

Referring again to FIG. 7A, supported audio configuration characteristic 706 can be used to describe supported parameters for streaming audio over an RTP session. An IP camera (or other audio source, such as intercom 328) can support any number of audio-streaming configurations. Each supported configuration can be represented as a data object, and the value of characteristic 706 can be an array with one data object per supported configuration. FIG. 7D shows elements of an example audio configuration data object expressed in key-value form. Audio-codec-type 723 can have an integer value that maps to one of a set of supported codec types (e.g., known audio codec types such as AAC-ELD, AMR, AMR-WB, MSBC, Opus, PCMA, PCMU, and/or other types). Audio-codec-params 725 can be a data object that provides parameters for a particular codec configuration. FIG. 7E shows elements of an example audio-codec-params data object 725 (expressed in key-value form). Channels 736 can have an integer value indicating the number of audio channels provided; in some embodiments, if channels 736 is omitted, a default value (e.g., one channel) can be assumed. Bit rate 737 can have a Boolean value indicating whether the bit rate is constant or variable. Sample rate 738 can have an integer value that maps to one of a set of supported sample rates (e.g., 8, 16, 24, 32 kHz). RTP-ptime 739 can have an integer value that maps to a packet time (i.e., the length of time represented by the media content of a packet, which can be, e.g., 20 ms, 40 ms, 60 ms, or some other length of time). In some embodiments, RTP-ptime 739 is not a fixed value in the configuration, in which case a controller can select the packet time when configuring a stream, e.g., as described below.

Referring again to FIG. 7A, supported RTP configuration characteristic 708 can be used to describe additional RTP stream characteristics that are independent of the codec and other particulars represented by supported video configuration characteristic 704 and supported audio configuration characteristic 706. For example, in some embodiments it may be desirable to use SRTP to secure the media streams, and the supported RTP configuration data object can include an identifier of the cryptologic suite ("crypto suite") that the IP camera uses to encrypt streamed media.

Characteristics 702-708 can be read by a (paired) controller to determine the available configurations for an IP camera (or other accessory that supports RTP streaming). Additional characteristics can be used to configure and control a media stream from the IP camera. For example, setup endpoints characteristic 710 can be used by a controller to exchange IP address and port information for an RTP session with the accessory. The controller can write to setup endpoints characteristic 710 to provide its own IP address and port information to the accessory and can read setup endpoints characteristic 710 to obtain the accessory's IP address and port information. In some embodiments, the setup endpoints data object written by the controller and the data object read by the controller can be different. As described below, establishing a media streaming session can include the controller writing to setup endpoints characteristic 710, then reading from setup endpoints characteristic 710.

FIG. 7F shows an example of a data object that a controller can write to setup endpoints characteristic 710 (expressed in key-value form) according to an embodiment of the present invention. The write data object can include a session-ID 751, which can be a UUID assigned by the controller to a media streaming session that is being set up. Controller address 752 can provide the IP address and port identifier(s) of the controller to be used for the streaming session. In some embodiments, controller address 752 can be a structured data object providing the IP address (and an indicator of whether IPv4 or IPv6 addressing is in use), a port identifier for receiving a video stream, and a port identifier for receiving an audio stream. SRTP video parameters 753 and SRTP audio parameters 754 can include information usable for encrypting the video and audio streams, such as an identifier of the crypto suite to be used, a master key, and a master salt. (The master key and master salt can be used in accordance with standard SRTP algorithms.)

FIG. 7G shows an example of a data object that a controller can read from setup endpoints characteristic 710 (expressed in key-value form) according to an embodiment of the present invention. The read data object can include a session ID 761. In embodiments where reading setup endpoints characteristic 710 follows writing to setup endpoints characteristic, session ID 761 can match session ID 751. Status 762 can indicate whether the setup request (implicit in writing to setup endpoints characteristic 710) succeeded or not; in the event of failure, status 762 can have an value that indicates the reason for failure. Accessory address 763 can provide the IP address and port identifier(s) of the accessory to be used for the streaming session; the format can be the same as controller address 752. SRTP video parameters 764 and SRTP audio parameters 765 can include information usable for encrypting the video and audio, streams—such as an identifier of the crypto suite to be used, a master key, and a master salt. (The master key and master salt can be used in accordance with standard SRTP algorithms.) Sync source video 766 and sync source audio 767 can identify a synchronization source (SSRC) for each stream (which can be defined according to RTP specifications).

Referring again to FIG. 7A, selected stream configuration characteristic 712 is a control point that can be written to by a control to control a media stream. (A "control point" can be a characteristic that the controller writes to but does not read, allowing the controller to operate the accessory.) In examples herein, it is assumed that the media stream has been partially defined via setup endpoints 712. FIG. 7H shows an example of a data object (expressed in key-value form) that can be written to selected stream configuration characteristic 712. Session ID 771 can be the same UUID that was written by the controller to session ID 751, allowing the data object to be associated with the appropriate streaming session. Command 772 can include an identifier of a session-control command that the controller is invoking in the write operation. Examples of session control commands include start session, end session, suspend streaming, resume streaming, and reconfigure stream.

The data object written to selected stream configuration characteristic 712 can also include selected video parameters data object 773 and/or selected audio parameters data object 774. In some embodiments, data objects 773 and/or 774 are included only when the controller is providing new or updated configuration parameters for the streaming session. For example, when starting or reconfiguring a streaming session, the controller can provide the data objects to define (or modify) the streaming parameters; when ending, pausing, or resuming a streaming session, data objects 773 and 774 can be omitted.

FIG. 7I shows an example of a selected video parameters data object 773 (in key-value form). Video codec type 781, video codec params 782, and video attributes 783 can have the same structure as video codec type 722, video codec params 724, and video attributes 726; the values should correspond to one of the supported video configurations defined by characteristic 704. Video RTP parameters 784 can include additional parameters needed for RTP streaming, such as RTP payload type, SSRC for the video stream, a maximum bit rate for the stream, a minimum interval for sending RTCP packets, and a maximum transmission unit (MTU) size (which can be omitted in cases where a default MTU is defined and the controller does not intend to change the MTU).

FIG. 7J shows an example of a selected audio parameters data object 774 (in key-value form). Audio codec type 785 and audio codec params 786 can have the same structure as audio codec type 723 and audio codec params 725; the values should correspond to one of the supported audio configurations defined by characteristic 706. Comfort noise 787 can have a Boolean value indicating whether the endpoints will or will not use a "comfort noise" codec (which can introduce artificial noise to fill in silences in the audio stream). Audio RTP parameters 788 can include additional parameters needed for RTP streaming, such as RTP payload type, SSRC for the audio stream, a maximum bit rate for the stream, a minimum interval for sending RTCP packets, and, in instances where comfort noise is enabled, an indicator of the payload type for comfort noise packets.

It is to be understood that an RTP streaming service can be implemented in any accessory that supports RTP streaming of audio and/or video. The various data objects can be varied as desired; additional examples are described in above-referenced U.S. patent application Ser. No. 14/614,914.

It is also to be understood that some accessories may support multiple concurrent RTP streams. For instance, an IP camera accessory may be able to provide concurrent RTP streams to two or more different controller devices. In some embodiments, providing multiple concurrent RTP streams can include providing multiple instances of RTP stream management service 602, with the number of instances being equal to the number of concurrently supportable streams. A controller attempting to initiate a stream can read the values of streaming status characteristic 702 of each instance of RTP stream management service 602 to identify a service instance for which the streaming status indicates that the service instance is available. The controller can interact with the identified instance to initiate streaming, e.g., as described below. In embodiments described herein, a separate stream is delivered to each controller that establishes a streaming session, and each stream can be encrypted such that only its destination controller can decrypt it.

In some embodiments, an IP camera can also offer other services, such as the ability of a controller to request and receive a still image capture (which can be requested regardless of whether the camera is currently capturing video; if the camera is capturing video, the still image can be a frame of captured video) and/or the ability to record video. In some embodiments, an IP camera can record video by storing it in a video data file, and additional services can be provided to retrieve stored video. The video data file can be stored in a local storage device of the IP camera or a network storage device with which the IP camera can communicate. An IP camera that does not have recording capability can stream the video data to another device that is capable of storing a video data file (e.g., a controller that configures a stream using the RTP streaming service); the other device can record the video.

FIG. 8 shows a definition of a doorbell service 802 according to an embodiment of the present invention, in a format similar to that of FIG. 6, and FIG. 9 shows definitions of characteristics for doorbell service 802, in a format similar to that of FIG. 7A. Doorbell service 802 can support operation of a doorbell accessory (e.g., doorbell 322 of FIG. 3). In some embodiments, a doorbell can be modeled as a switch that is activated (e.g., by being pressed) and deactivated (e.g., by being released); a doorbell may have other optional features such as volume control (e.g., to control the volume of the sound that is generated when the doorbell is pressed) and an illumination control (e.g., to control the brightness of a light illuminating the doorbell button). As shown in FIG. 9, programmable switch event characteristic 902 can provide a notification to subscribed controllers when the switch changes state (e.g., when the doorbell is pressed), thereby allowing controllers to receive a notification whenever the doorbell is operated. For a doorbell with volume control, volume characteristic 904 can be used to control the volume; its value can be, e.g., a floating-point number representing a percentage of maximum volume. For a doorbell with illumination control, brightness characteristic 906 can be used to control the brightness of the illuminating light source; its value can be, e.g., a floating-point number representing a percentage of maximum brightness. The characteristics shown are illustrative, and it is to be understood that any controllable property or function of a specific doorbell can be controlled by defining one or more corresponding characteristics and including those characteristics in a service instance corresponding to that specific doorbell. It is also to be understood that other types of "sensor" accessories can have a characteristic similar or identical to programmable switch event characteristic 902 and that controllers can subscribe to receive notifications of changes to such characteristics.

FIG. 10 shows a definition of a lock mechanism service 1002 according to an embodiment of the present invention, in a format similar to that of FIG. 6, and FIG. 11 shows definitions of characteristics for lock mechanism service 1002, in a format similar to that of FIG. 7A. Lock mechanism service 1002 can support operation of a lock accessory (e.g., door lock 324 of FIG. 3). In some embodiments, a lock can be modeled as a movable object that can be in an "unlocked" state, a "locked" state, or in transition from locked to unlocked state (or vice versa). The lock can be controlled by specifying a "target" state (locked or unlocked), to which the lock should transition if it is not already there. As shown in FIG. 11, lock mechanism current state characteristic 1102 can be a read-only characteristic that indicates the current state (e.g., locked, unlocked, locking (becoming locked), unlocking (becoming unlocked)). Lock mechanism target state characteristic 1104 can be a write-only characteristic that indicates the desired state (e.g., locked or unlocked). The characteristics shown are illustrative, and it is to be understood that any controllable property or function of a specific lock mechanism can be controlled by defining one or more corresponding characteristics and including those characteristics in a service instance corresponding to that specific lock mechanism. For example, the lock mechanism may provide a readable characteristic to allow controllers to determine the last action taken at the lock (regardless of how the action was taken) and/or a characteristic usable to establish an automatic timeout period such that the lock mechanism automatically locks again after the timeout period.

FIG. 12 shows a definition of a light service 1202 according to an embodiment of the present invention, in a format similar to that of FIG. 6, and FIG. 13 shows definitions of characteristics for light service 1202, in a format similar to that of FIG. 7A. Light service 1202 can support operation of a light accessory (e.g., light 326 of FIG. 3). In some embodiments, a light can be modeled as an object that can be turned on or off. Some lights may have additional controllable parameters, such as brightness and/or color (which can be modeled, e.g., using hue and saturation or other color modeling schemes). As shown in FIG. 13, "On" characteristic 1302 can be read to determine whether the light is currently on or off and written to turn the light on or off. Brightness characteristic 1304 can be a different instance of the same brightness characteristic 906 defined in connection with doorbell service 802. The characteristics shown are illustrative, and it is to be understood that any controllable property or function of a specific lighting device can be controlled by defining one or more corresponding characteristics and including those characteristics in a service instance corresponding to that specific lighting device. For example, if the lighting device has controllable color, one or more color-related characteristics (e.g., hue and/or saturation characteristics) can be provided to allow controllers to control the color.

FIG. 14 shows definitions of services that can be included in an intercom accessory according to an embodiment of the present invention, in a format similar to that of FIG. 6, and FIG. 15 shows definitions of characteristics for some of these services, in a format similar to that of FIG. 7A. The intercom accessory can be e.g., intercom 328 of FIG. 3, which can support two-way audio communication. Microphone service 1402 can be used to control a microphone that can pick up the voice of a person operating intercom 328. Speaker service 1404 can be used to control a speaker that can play audio received from a controller (e.g., controller 302) such that it can be heard by a person operating intercom 328. RTP audio management service 1406 can be used to stream audio between intercom 328 and a controller (e.g., controller 302). RTP audio management service 1406 can be similar RTP stream management service 602 described above (except that video streaming is omitted); in some embodiments, RTP audio management service can support two-way audio streaming to allow bidirectional communication. Since two-way streaming using RTP can be accomplished by defining a separate stream in each direction, those skilled in the art with access to the present disclosure will understand that the characteristics defined with reference to FIGS. 7A-7J can also be used to define and control audio and/or video streams from a controller to an accessory.

Microphone service 1402 and speaker service 1404 can each include an instance of mute characteristic 1502 and volume characteristic 1504. In the case of microphone service 1402, mute characteristic 1502 can be used to selectively mute or unmute the microphone (as used herein a "muted" microphone either does not provide an audio signal or provides a signal indicating that no sound was detected), and volume characteristic 1504 can be used to adjust the gain of the microphone, which can increase or decrease the volume of the sound produced. (The value of volume characteristic can be, e.g., a percentage of maximum volume.) In the case of speaker service 1404, mute characteristic 1502 can be used to selectively mute or unmute the speaker (as used herein, a "muted" speaker does not generate sound), and volume characteristic 1504 can be used to adjust the volume of the sound generated by the speaker. The characteristics shown are illustrative, and it is to be understood that any controllable property or function of a specific intercom, microphone, or speaker can be controlled by defining one or more corresponding characteristics and including those characteristics in a service instance corresponding to that specific device.

It should also be understood that the various services and accessories can, but need not, correspond to physically separate devices. A given service can be defined for any accessory device that has suitable hardware (and where applicable software) components to provide the service. In some embodiments, a uniform accessory protocol allows a manufacturer of an accessory to provide an "accessory model" data object that defines an instance of each service supported. (In some cases, an accessory may support multiple instances of the same service.) Each service instance can be assigned an instance identifier that is unique across all services of the accessory. The service instance can also include an instance of each characteristic defined for the service (which can include any required characteristics as well as any optional characteristics that the accessory manufacturer chooses to support), and each characteristic can also be assigned an instance identifier that is unique across all characteristics of the accessory. In some embodiments, instance identifiers can be assigned to service instances and characteristic instances using monotonically increasing integers, and each instance identifier is unique to one service or characteristic instance of the accessory.

Accordingly, an integrated entry control system can be provided using any set of accessory devices that together provide at least a minimum set of services. In some embodiments, the "minimum" set of services for integrated entry control can be defined as including: a doorbell service (allowing a notification that someone is at the door); an RTP stream management service (allowing real-time streaming of video from an IP camera positioned with a view of the door); and a lock mechanism service (allowing control over the door lock). Additional "includable" services can be included if available, such as a camera control service for the IP camera, a light service (allowing control of an associated light to illuminate the doorway area), and microphone and/or speaker services (to allow voice communication with a person at the door).

Figure 16A:
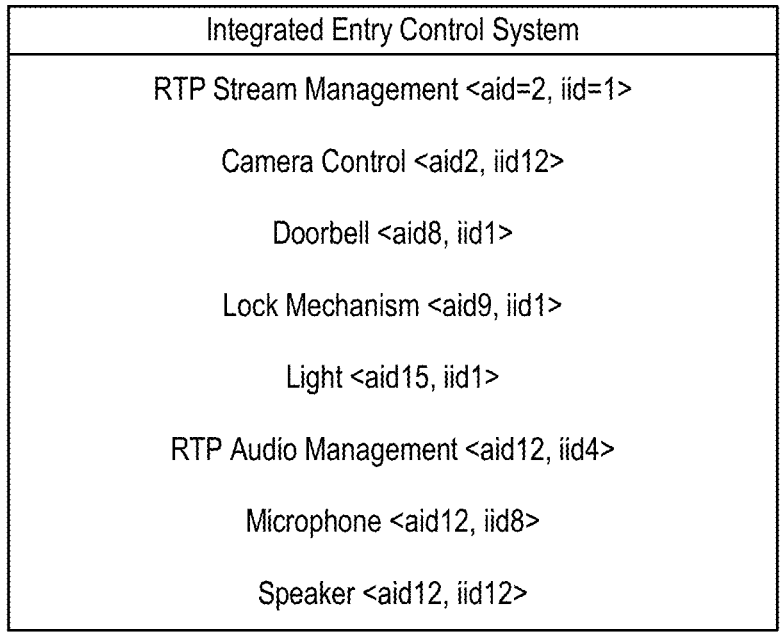
FIGS. 16A and 16B show two different configurations for an integrated entry control system according to various embodiments of the present invention.
Figure 16B:
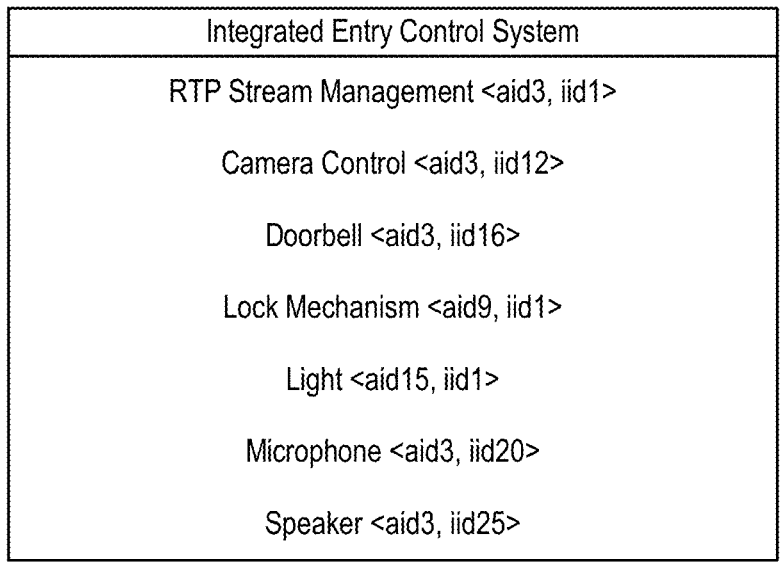

FIGS. 16A and 16B show two different configurations for an integrated entry control system according to various embodiments of the present invention. In each case, the configuration of the integrated entry control system is specified by identifying the included services; for each included service, an accessory identifier (aid) of an accessory data object that provides the service and the instance identifier (iid) assigned to the service instance by the accessory data object are indicated.

FIG. 16A relates to an embodiment similar to that shown in FIG. 3. In this example, an instance of RTP stream management service 602 and an instance of camera control service 604 are provided by one accessory (aid=2), which can correspond to IP camera 320 of FIG. 3. An instance of doorbell service 802 is provided by a second accessory (aid=8), which can correspond to doorbell 322 of FIG. 3. An instance of lock mechanism service 1002 is provided by a third accessory (aid=9), which can correspond to door lock 324 of FIG. 3. An instance of light service 1202 is provided by a fourth accessory (aid=15), which can correspond to light 326 of FIG. 3. An instance of RTP audio management service 1406, an instance of microphone service 1402, and an instance of speaker service 1404 are all provided by a fifth accessory (aid=15), which can correspond to intercom 328 of FIG. 3.

FIG. 16B relates to a different embodiment that provides the same functionality as that shown in FIG. 3, but with a different physical configuration. In this example, a single accessory (aid=3) provides an instance of RTP stream management service 602, an instance of camera control service 604, an instance of doorbell service 802, an instance of microphone service 1402, and an instance of speaker service 1404. (In this example, RTP stream management service 602 is assumed to support two-way audio streaming as well as one-way video streaming.) Such an accessory can be, for example, a "video doorbell" device that incorporates a doorbell, an IP camera, a microphone, and a speaker in a shared housing that can be mounted near a door. An instance of lock mechanism service 11002 is provided by a second accessory (aid=9), and an instance of light service 1202 is provided by a third accessory (aid=15).

It is to be understood that the examples in FIGS. 16A and 16B are illustrative. Any number of discrete accessory devices can be used in an integrated entry control system, and the particular combination of service instances included can be varied. For example, although a doorbell is used herein as an example of a presence sensor that can determine when someone is at the door, other types of presence sensors can be used in addition to or instead of a doorbell. Presence sensors that can be included in an integrated entry control system can include passive presence sensors such as motion sensors and/or audio sensors (which can be triggered by movement or sound without intentional action by a person whose presence is being sensed) and active sensors such as doorbells, keypads, or other user-operable devices. Any combination of presence sensors can be used, and a presence sensor or other sensor can be modeled as a service instance that includes a notification characteristic similar to programmable switch event characteristic 902.

As another example, an alarm system can be modeled using one or more instances of an alarm service, the characteristics of each instance can include a status (e.g., armed, disarmed, triggered), a status-change characteristic that can be used to generate notifications to subscribing controllers when the status changes, and so on. In some embodiments, an alarm service instance can be incorporated into an integrated entry control system; accordingly, if a door is protected by an alarm system (or component thereof) that can be triggered by opening the door, the user interface for the integrated entry control system can include an option to arm or disarm the door alarm.

In addition, those skilled in the art with access to the present disclosure will appreciate that integrated accessory control systems are not limited to entry control. Any combination of accessory services (which can be provided by one or more accessories) can be defined as an integrated accessory control system, and a user interface can be created to present a "control panel" for interacting with the various accessory services that comprise the integrated accessory control system. Further, some integrated accessory control systems can be configured to be automatically activated. For instance, the integrated accessory control system can include a sensor accessory, which can include any type of sensor that can detect activity or changes in its environment. Examples include: doorbells, light switches, other switches, or other mechanical devices that can be activated by a person (e.g., by pressing a button, moving a lever, flipping a switch, turning a knob, etc.), with a sensor detecting the activation and generating an electrical signal indicative of the activation; motion sensors that can be installed in an area and can be activated by a person or object moving through the environment (regardless of whether the moving person intends to activate the sensor); sound sensors that can detect sounds above a threshold level associated with background noise (such as might be made by a person); movement sensors installed on doors, windows, or other movable objects that can detect when the movable object is moved (e.g., detecting when a door is being opened); and so on. In some embodiments, the sensor accessory can operate as an "activator" for the integrated accessory control system. When the activator detects activity, it can generate a notification to a subscribed controller, prompting the controller to generate a user interface for interacting with an integrated accessory control system of which the activator is a component.

Example Interactions with Integrated Accessory Control System

An integrated accessory control system definition (e.g., an integrated entry control system definition as shown in FIGS. 16A and 16B) can be incorporated into a model of an automated environment, such as a home. In some embodiments, a user operating a controller can, after identifying accessories and associating them with the environment, manually select service instances to be included in an integrated accessory control system. However, manual selection can be tedious. Accordingly, some embodiments of the present invention can provide automated tools to facilitate defining an integrated accessory control system.

Figure 17:
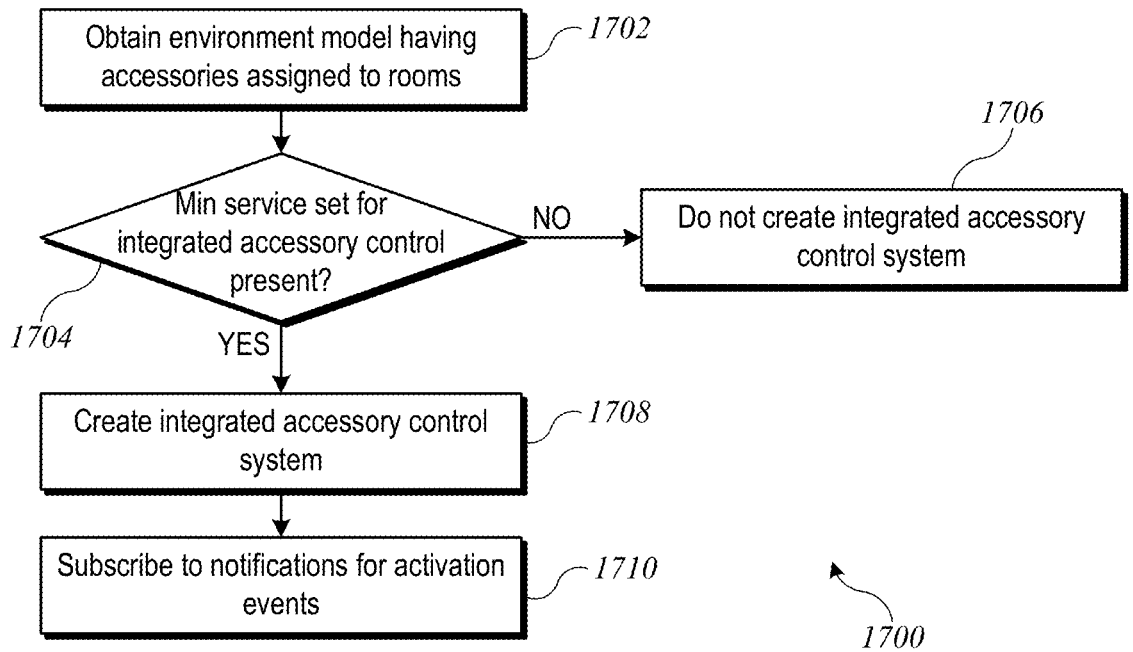
FIG. 17 shows a flow chart of a process for defining an integrated accessory control system according to an embodiment of the present invention.

FIG. 17 shows a flow chart of a process 1700 for defining an integrated accessory control system according to an embodiment of the present invention. Process 1700 can be performed by a controller that is being operated to define or modify an automated environment. At block 1702, the controller can obtain an environment model (e.g., as defined above) in which accessories are assigned to rooms. In some embodiments, a user can operate the controller to define an automated environment, e.g., by initially populating an environment model with information about the environment. For instance, the user can be prompted to input a name for the environment and a name for each room that should be included in the environment model (e.g., kitchen, living room, foyer, master bedroom, etc.). The user can add accessories to the environment by establishing a pairing between the accessory and a controller (e.g., using pair add as described above). After the pairing is established, the controller can obtain the accessory model data object from the accessory and determine the service instances provided by the accessory. In addition, the user can be prompted to indicate the room in the environment model to which the accessory should be assigned. In some embodiments, it may be possible to automatically determine a room assignment for an accessory. For instance, RF fingerprinting may be used to determine which room the controller is currently in (e.g., based on signals from accessories that have previously been assigned to rooms), and a newly added accessory can be assigned to the room the controller is in. The user can be prompted to confirm or modify any automatic room assignments. In some embodiments, an environment model may have already been defined, and block 1702 can include obtaining previously defined environment model (e.g., by accessing a location where the environment model is stored).

For any room to which one or more accessories have been assigned, at block 1704, process 1700 can determine whether the accessories in the room provide instances of a minimum set of services for an integrated accessory control system. For instance, in the case of an integrated entry control system, the minimum set of services may include an IP camera service, a doorbell service (or other sensor service that can be used as an activator), and a lock mechanism service. The determination can be based on inspection of service instances defined for the accessory model data objects that have been assigned to the room. Thus, for example, in the case of an integrated entry control system, if a user has added IP camera 320, doorbell 322, and door lock 324 to a room (which might be, e.g., a room called foyer, living room, or entry area, depending on what rooms the user has chosen to define in the model), block 1704 can result in a determination that the minimum set of services is provided.

If the minimum set of services for an integrated accessory control system has not been provided, then at block 1706, process 1700 can determine not to define an integrated accessory control system at this time. It should be noted that process 1700 can continue, e.g., with the user adding more accessories at block 1702, and the minimum set of services may eventually be provided in a given room.

If, at block 1704, the minimum set of services for an integrated accessory control system has been provided, then at block 1708, process 1700 can create an integrated accessory control system. For example, process 1700 can create a data object similar to that shown in FIG. 16A (or FIG. 16B) that specifies an accessory identifier and instance identifier for each service instance that is being included in the integrated accessory control system. In defining the integrated accessory control system, any other "includable" service instances beyond the minimum set can also be included if they are provided by an accessory in the room (also referred to as being present in the room). Thus, for example, in the case of an integrated entry control system, based on the presence of IP camera 320, doorbell 322, and door lock 324 in the same room, process 1700 can create an integrated entry control system and can include services of other accessories, such as light 326 and intercom 328, in the system if instances of these services are present. In cases where multiple instances of an includable service are present, process 1700 can include prioritizing logic to select an instance to include. For example, if two or more IP cameras are associated with the same room as the doorbell, an IP camera that is integrated into a common housing with the doorbell may be preferentially selected. In some embodiments, process 1700 can also include (at block 1710) subscribing to notifications for activation events related to the integrated accessory control system; the activation events can include state changes for a characteristic of the activator accessory service. For instance, in the case of an integrated entry control service, the controller can subscribe to notifications of doorbell events (e.g., as described above with reference to FIGS. 8 and 9). In some embodiments, the notification can be used by a controller to trigger display of a user interface for interacting with the integrated accessory control system (e.g., an interface as shown in FIGS. 4 and 5).

It is to be understood that process 1700 is illustrative and variations and modifications are possible. Some or all of the actions can be automated, and a user interface can be provided to allow a user to confirm, modify, or reject the result of any automated action. For instance, when an integrated accessory control system is automatically created at block 1708, process 1700 can generate a visual notification on the controller indicating that the system has been created, and the user can accept, modify, or reject the proposed system. Thus, for example, if the user wants to replace the automatically selected IP camera or light with a different instance, the user can do so.

Any type of integrated accessory control system can be automatically created in a similar manner. For any particular type of integrated accessory control system, a minimum set of services (e.g., an accessory service that can operate as an activator and an IP camera) can be defined, and additional includable services can also be defined. When accessories providing the minimum set of services are provided in the same room (or in some other grouping of accessories), a controller that is tasked with defining or modifying a model of the automated environment can automatically add an integrated accessory control system object to the model. As noted above, the user can have the option to modify or remove any automatically created integrated accessory control systems.

Once an integrated accessory control system has been defined, the system can be operated to allow a user to control operations associated with the integrated accessory control system. For example, the user can view a live feed from an IP camera included in the system, operate door locks, lights, and/or any other user-operable accessories included in the system, and so on.

Figure 18:
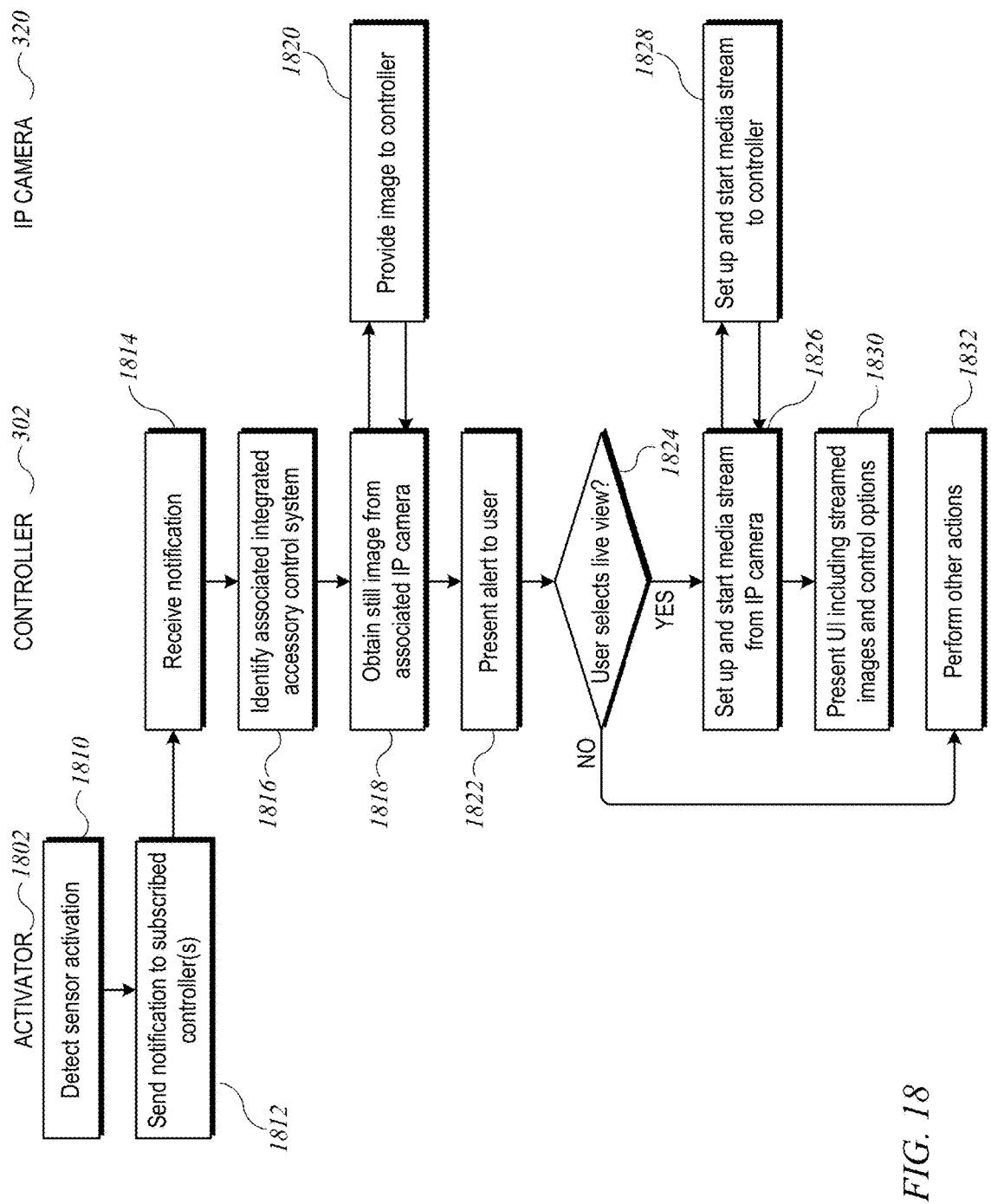
FIG. 18 shows a flow diagram of a process for interacting with an integrated accessory control system according to an embodiment of the present invention.

FIG. 18 shows a flow diagram of a process 1800 for interacting with an integrated accessory control system according to an embodiment of the present invention. Process 1800 can be implemented using a controller (e.g., controller 302) and accessories that are components of the integrated accessory control system, such as IP camera 320 and an activator accessory 1802 (which can be, e.g., doorbell 322 or any other sensor accessory capable of generating a notification when an activity occurs). It is assumed that an integrated accessory control system has been defined (e.g., using process 1700) and that controller 302 has subscribed to receive notifications from activator accessory 1802.

At block 1810, activator accessory 1802 can detect activation of its sensor. For example, if activator accessory 1802 is doorbell 322, activator accessory 1802 can detect operation of the doorbell (e.g., pushing the doorbell button) and change its programmable switch event characteristic 902. If activator accessory 1802 is a motion sensor, activator accessory 1802 can detect movement. At block 1812, responsive to the sensor activation, activator accessory 1802 can send a notification to any controllers that have subscribed to receive notifications of events (e.g., changes to characteristic 902 or to another sensor event characteristic similar to characteristic 902, depending on the particular accessory and sensor).

At block 1814, controller 302 can receive the notification from activator accessory 1802. At block 1816, controller 302 can identify an associated integrated accessory control system for the activator accessory. For example, if activator accessory 1802 is a doorbell, controller 302 can read the data structure of FIG. 16A (or similar data structure) and determine that activator accessory 1802 is part of the integrated entry control system defined by the data structure of FIG. 16A. If controller 302 receives a notification from an accessory that is not an activator associated with an integrated accessory control system, controller 302 can generate an alert to the user and/or take other action depending on its configuration.

Assuming an associated integrated accessory control system is identified at block 1816 (and further assuming that the integrated accessory control system includes IP camera 320), at block 1818, controller 302 can obtain a still image from IP camera 320, which is an IP camera accessory associated with the integrated accessory control system; IP camera 320 can provide the still image at block 1820. Various techniques can be used. For example, in some embodiments, IP camera 320 can support an "image snapshot" feature that allows a paired controller (including coordinator 310) to request a static image captured by the camera. For example, where commands are sent to accessories as HTTP requests, an "image snapshot" can be defined as an available resource. Coordinator 310 (or any other controller) can send an HTTP POST request to a "resources" URL defined at IP camera 320, with a message body indicating that an image is requested and optionally specifying image parameters (e.g., height and width in pixels). In response to the HTTP POST request, IP camera 320 can capture a single image and transmit it to the requesting controller, e.g., using a standard image format such as JPEG.

At block 1822, controller 302 can present an alert to its user. This can be similar to the alert shown in FIG. 4 and can include an option to see a live view from IP camera 320, an option to dismiss the alert, and/or other options as desired. If, at block 1824, the user selects a live view, then at block 1826, controller 302 can set up and start a media stream from IP camera 320. IP camera 320 can participate in the setup and streaming process at block 1828. Examples of processes for setting up and starting a media stream is described below.

At block 1830, controller 302 can present a user interface operable to interact with the integrated entry control system, which can be similar or identical to the user interface screen shown in FIG. 5. The user interface can include the streamed media from IP camera 320 and control options to interact with any or all of the various accessory services that are included in the integrated accessory control system (e.g., as defined by a data structure similar to that of FIG. 16A or 16B). Presentation of the user interface can continue until the user exits the interface. If the user does not select live view at block 1824, controller 302 can perform other actions at block 1832; the specific actions at block 1832 can depend on what the user does instead of selecting live view and are not relevant to understanding the present disclosure.

Process 1800 is illustrative, and variations and modifications are possible. For example, although FIG. 18 does not show any intermediary devices between controller 302 and the accessories (activator accessory 1802 and IP camera 320), such intermediaries can be present. In some embodiments, controller 302 can communicate directly with accessories when it is within communication range of the accessories; when it is not in communication range of the accessories, controller 302 can communicate with the accessories via coordinator 310 or other devices that can act as a relay for messages and data exchanged between controller and accessories. Specific examples of streaming media via coordinator 310 are described below.

In addition, while integrated entry control is used as an example, integrated accessory control systems are not limited to entry control. Any combination of accessory services (which can be provided by one or more accessories) can be defined as an integrated accessory control system, and a user interface can be defined to present a control panel for interacting with the various accessory services that comprise the integrated accessory control system. Processes similar to FIG. 18 can be used.

Further, in some embodiments, an integrated accessory control system can provide other options, such as automatically recording a still image and/or video from IP camera 320 in response to a notification from an activator accessory. In some embodiments, the user interface can present options for the user to start a recording or capture a still image, e.g., while viewing the live feed.

A variety of user experiences can be provided. FIGS. 4 and 5, described above, illustrate one example of a user experience. In some embodiments, the user can have other options, such as saving a still image while viewing the live feed from the IP camera and/or an option to start recording video from the IP camera (which can be presented before or after the user chooses to view the live feed). In some embodiments, a user experience where the activator is a motion sensor can include receiving an alert (similar to FIG. 4) when the motion sensor detects movement. The alert can offer options to view and/or save a still image from the IP camera, to view a live feed from the IP camera, and/or to record a feed from the IP camera. In some embodiments, any time the user starts a live stream, the live stream can automatically be recorded.

Example Media Streaming Processes

Figure 19A:
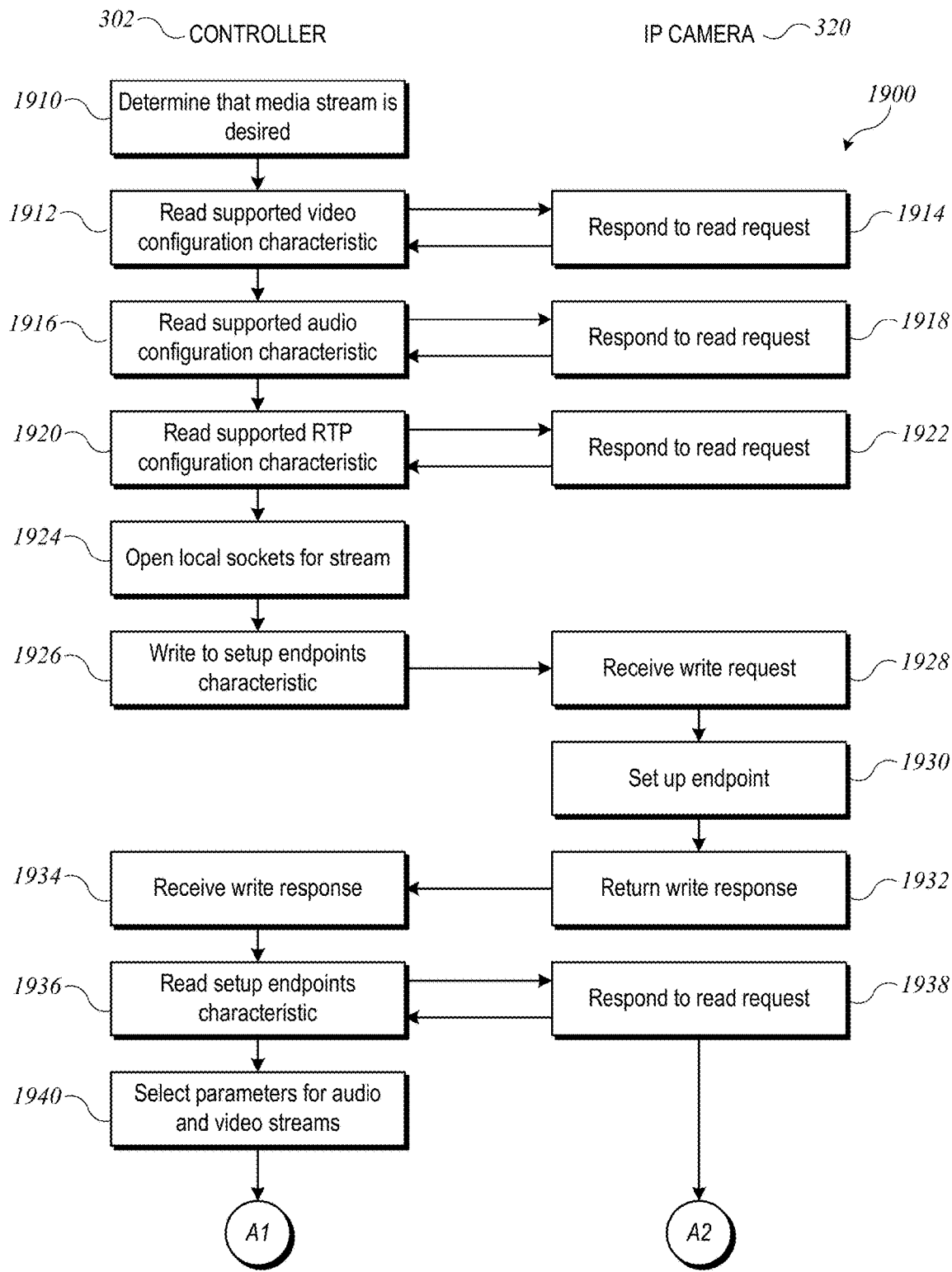
FIGS. 19A and 19B show a flow diagram of a process for setting up and providing a media stream between an IP camera accessory and a controller according to an embodiment of the present invention.
Figure 19B:
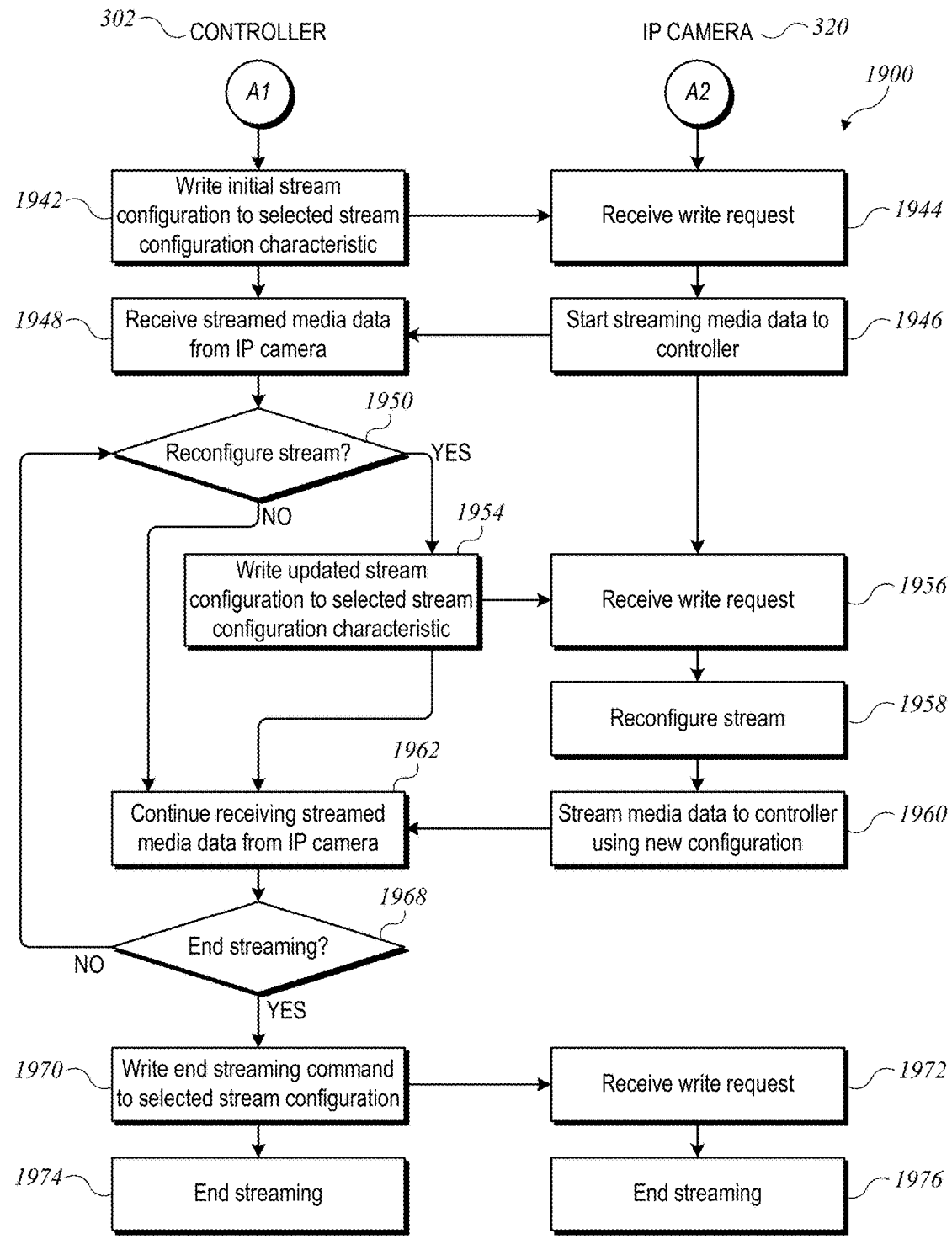

FIGS. 19A and 19B show a flow diagram of a process 1900 for setting up and providing a media stream between an IP camera accessory (e.g., IP camera 320) and a controller (e.g., controller 302) according to an embodiment of the present invention. Process 1900 assumes that IP camera 320 provides an instance of RTP stream management service 602 (as described above); the process can be adapted to other RTP streaming services. In this example, controller 302 communicates directly with IP camera 320, although it is to be understood that the messages and data can be transmitted via one or more intermediary devices (e.g., coordinator 310). Additional examples that include indirect communication paths are described below.

Referring first to FIG. 19A, at block 1910, controller 302 can determine that it desires to receive a media stream from IP camera 320. This can occur, e.g., if the user selects the live view option at block 1822 of process 1800. Prior to setting up the stream, controller 302 can determine what streaming configurations are supported by IP camera 320. For instance, at block 1912, controller 302 can read supported video configuration characteristic 704, e.g., by sending a characteristic read request to IP camera 320. IP camera 320 can respond to the read request at block 1914. In this example, it is assumed that IP camera 320 supports audio streaming as well as video, and at block 1916, controller 302 can read supported audio configuration characteristic 704, e.g., by sending a characteristic read request to IP camera 320. IP camera 320 can respond to the read request at block 1918. At block 1920, controller 302 can read supported RTP configuration characteristic 708, e.g., by sending a characteristic read request to IP camera 320. IP camera 320 can respond to the read request at block 1922. In some embodiments, these read operations can be performed prior to when controller 302 determines that a media stream is desired, and the information obtained can be cached by controller 302.

At block 1924, which can occur when controller 302 is ready to start receiving the media stream, controller 302 can open local sockets for the stream. Any process that opens a socket usable for reception of an RTP stream can be used, and a socket can be opened for each stream to be received (e.g., audio and video can have separate sockets). At block 1926, controller 302 can write a data object (e.g., as described above with reference to FIG. 7F) to setup endpoints characteristic 712 of IP camera 320. IP camera 320 can receive the write request at block 1928. At block 1930, IP camera 320 can set up its own endpoint (e.g., opening local sockets and establishing other session specific parameters as appropriate). At block 1932, IP camera 320 can return a response to the write request, indicating that its setup is completed. Controller 302 can receive the write response at block 1934.

At block 1936, controller 302 can read setup endpoints characteristic 712 of IP camera 320, e.g., by sending a characteristic read request. At block 1938, IP camera 302 can respond to the read request, e.g., by sending a data object as described above with reference to FIG. 7G. Controller 302 can use the information to configure one or more RTP streaming sessions.

At block 1940, controller 302 can select parameters to be used for audio and video streams (e.g., particular codecs and configurations of the codecs, as described above).

Referring now to FIG. 19B, process 1900 can continue (nodes A1 and A2). At block 1942, controller 302 can provide an initial stream characteristic to IP camera 320, e.g., by writing a data object to selected stream configuration characteristic 714 as described above. The data object can be as described above with reference to FIG. 7H, and command 772 can indicate start of a session. At block 1944, IP camera 320 can receive the write request. Based on the setup information and the selected stream configuration, IP camera 320 can begin streaming media to controller 302 at block 1946; controller 302 can begin receiving the stream at block 1948. Controller 302 can decrypt and decode the stream and present media via its user interface.

In some embodiments, controller 302 can dynamically reconfigure a media stream, and at block 1950, controller 302 can periodically determine whether to reconfigure the stream. For example, controller 302 may perform quality monitoring on the received media stream(s) to determine whether bitrate of the media stream should be increased or decreased. As another example, where coordinator 310 is operating as a packet relay for the media stream(s), coordinator 310 may be able to detect conditions on a local area network suggesting that the bitrate of the media stream should be increased or decreased and communicate information to controller 302 to indicate that the stream should be reconfigured. Examples of processes for determining whether to reconfigure a stream are described below.

If the determination is made at block 1950 to reconfigure the stream, then at block 1954, controller 302 can instruct IP camera 310 to reconfigure the stream. For example, controller 302 can write an updated stream configuration data object (e.g., as shown in FIG. 7H) to selected stream configuration characteristic 714. Command 772 can be set to a value indicating that the stream is being reconfigured, and in some embodiments, the data objects may include only parameters that are being modified.) IP camera 320 can receive the write request at block 1956. At block 1958, IP camera 320 can reconfigure the stream without affecting the RTP session or restarting the stream. For example, if the reconfiguration changes the image resolution, the next RTP packet after reconfiguring can be an IDR packet at the new resolution; its sequence number can be the next sequential number. Its time stamp can account for the time taken to perform the reconfiguration and generate the next RTP packet. At block 1960, IP camera 320 can continue streaming media data using the new configuration, and at block 1962 (regardless of whether the configuration was changed), controller 302 can continue receiving the streamed media data.

In some embodiments, only some of the parameters defined by selected stream configuration characteristic 714 can be dynamically reconfigured (i.e., without affecting the RTP session or restarting the stream). For example, changes to image size, frame rate, maximum bitrate, and minimum RTCP interval can be made dynamically. Dynamic changes to the codec or codec parameters might not be supported. Further, in some embodiments, dynamic reconfiguration is performed only for video streams, although dynamic reconfiguration of audio streams can be provided if desired.

It is to be understood that streaming can continue indefinitely. Controller 302 can periodically determine whether to reconfigure the stream, and any number of reconfigurations may occur. In some embodiments, IP camera 320 may also be configured to perform quality monitoring (e.g., based on RTCP packets received from controller 302) and to determine whether to reconfigure the stream; reconfiguration by IP camera 320 can be performed using standard RTP and RTCP procedures.

Eventually, at block 1968, controller 302 can determine that streaming should end (e.g., if the user closes the interface screen of FIG. 5). In response to this determination, at block 1970, controller 302 can instruct IP camera 320 to end the streaming session, e.g., by writing an updated stream configuration data object (e.g., as shown in FIG. 7H) to selected stream configuration characteristic 714. Command 772 can be set to a value indicating that the session is being ended. At block 1972, IP camera 320 can receive the write request, and the streaming session can end at blocks 1974 and 1976. It is to be understood that new streams can be started at any time and that, if the devices support it, any number of streams and streaming sessions can exist concurrently.

Dynamic Bitrate Adaptation

Streaming of video data using RTP involves sending a stream of packets that contain data describing a sequence of images (frames) to be presented at specified time intervals (frame rate). The bandwidth required depends on the amount of data per image (which may be controlled by adjusting resolution, or number of pixels in the image) and the frame rate, which together determine a bitrate for the stream. (There may also be transport-dependent packet overhead, but that can be treated as constant for a given streaming session.) In some situations, available bandwidth may be limited, e.g., due to competing demands from other communication operations or the physical characteristics of a network (e.g., inherent limitations of RF signaling protocols, RF fading effects that may depend on where a transmitter or receiver is), and so on. Accordingly, during media streaming (e.g., using process 1900), it may be desirable to dynamically adjust the bandwidth of the media stream based on current conditions. For instance, where bandwidth is constrained, image resolution and/or frame rate can be reduced; conversely, if bandwidth is abundant, it may be desirable to increase the bitrate to provide a higher quality video at the receiving end. Accordingly, as described above, a controller that is receiving a video stream can dynamically reconfigure the video stream to increase or decrease the bitrate depending on whether network bandwidth is able to accommodate the current bitrate.

In some embodiments, a controller (e.g., controller 302) can define a set of "bitrate tiers" for a video stream. Each tier can correspond to a specific combination of image resolution and frame rate, which implies a particular bitrate, and each tier can have a different bitrate. The tiers can be spaced exponentially in order of increasing bitrate (other spacing can be substituted). The particular combination of image resolution and frame rate for a tier can be selected as desired. For instance, in the case of integrated entry control system 300, it may be assumed that a clear image of the person at the door (which depends on image resolution) is of more use than smooth movement (which depends on frame rate). Accordingly, for a given bitrate tier, high image resolution can be prioritized over frame rate. For instance, a "top" bitrate tier might be defined as image resolution of 1920×

1080 and frame rate of 24 frames per second. The next bitrate tier might reduce the frame rate (e.g., to 12 frames per second) while preserving the image resolution. For the user viewing the video, this may provide a clear but jerky view of the person at the door.

Having defined a set of bitrate tiers, controller 302 can attempt to determine the most appropriate tier based on network performance; in some embodiments, the goal can be to identify the highest bitrate tier that can be supported given the available bandwidth.

Figure 20:
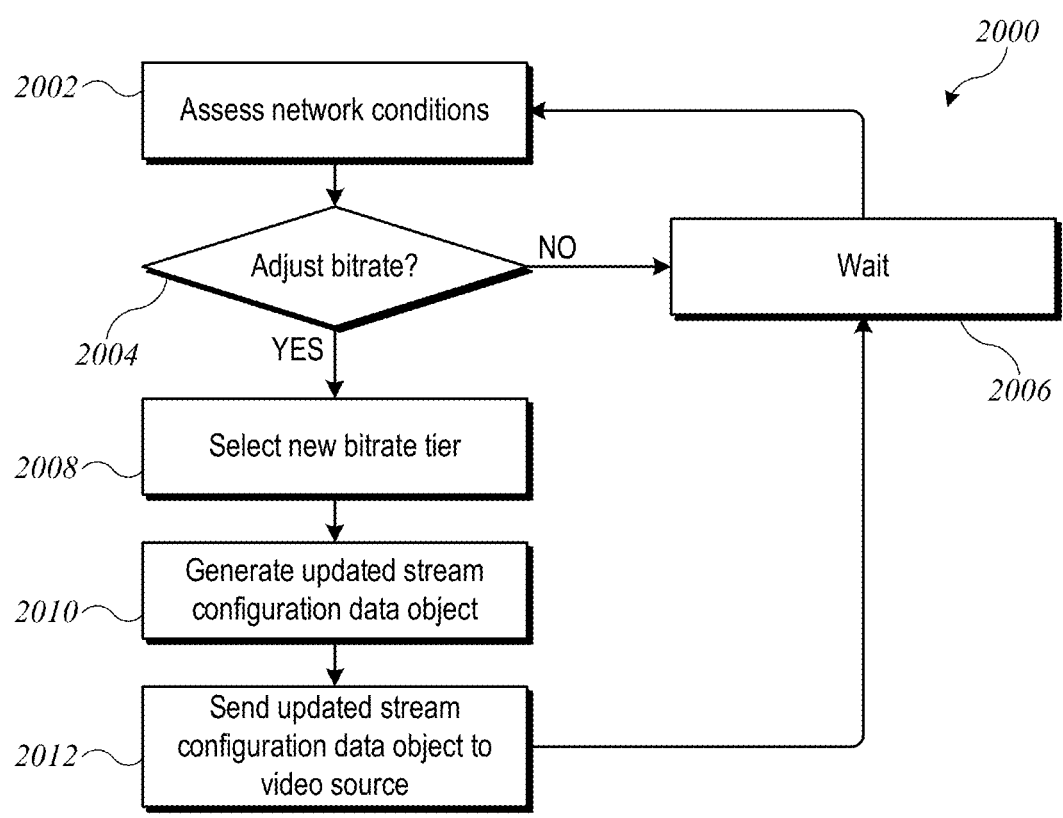
FIG. 20 is a flow diagram of a process for dynamically adjusting bitrate of a video stream according to an embodiment of the present invention.

FIG. 20 is a flow diagram of a process 2000 for dynamically adjusting bitrate of a video stream according to an embodiment of the present invention. Process 2000 can be implemented by a device that receives a video stream, e.g., controller 302 executing blocks 1950-1962 of process 1900 with a video stream received from IP camera 320.

At block 2002, controller 302 can assess network conditions. Various mechanism can be used to measure parameters that are useful indicators of whether network congestion is increasing or decreasing. For example, the RTP Control Protocol (RTCP), defined by IETF RFC 3550 and extended by IETF RFC 4585 and IETF RFC 5104, provides a mechanism whereby participants in an RTP streaming session can periodically report statistics indicative of stream quality. Using RTCP, controller 302 can periodically send receiver reports to IP camera 320 and can periodically receive sender reports from IP camera 320. In this case, the video stream is one-way, so IP camera 320 does not send receiver reports or receive sender reports. The reports, and data generated in association with sending the reports, can be used to determine information about network conditions, such as packet loss, one-way transmission delay, and variation in one-way transmission times. However, in the context of one-way video streaming, other useful indicators, such as round-trip time, cannot be determined using RTCP.

Figure 21:
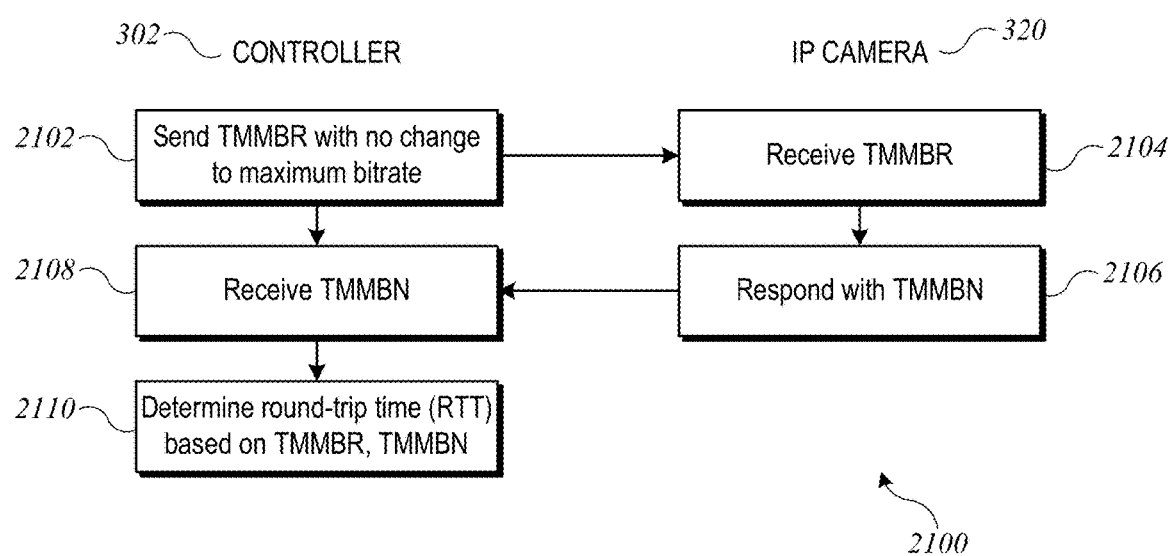
FIG. 21 is a flow diagram of a process for determining round-trip time according to an embodiment of the present invention.

Accordingly, some embodiments of the present invention may provide additional mechanisms for determining round-trip time (RTT). FIG. 21 is a flow diagram of a process 2100 for determining round-trip time according to an embodiment of the present invention. Process 2100 can be implemented using controller 302 and IP camera 320. Process 2100 can leverage RTCP feedback extensions defined in IETF RFC 5104 for purposes of estimating RTT. In some embodiments, process 2100 can be performed at every RTCP reporting interval.

At block 2102, controller 302 can send a TMMBR message to IP camera 320. The TMMBR message can be the temporary maximum media stream bitrate request as defined in IETF RFC 5104, with the requested bitrate set to the current maximum media stream bitrate. In some embodiments, controller 302 can send the TMMBR message together with every RTCP receiver report.

At block 2104, IP camera 320 can receive the TMMBR message. Since the requested bitrate is the same as the current maximum media stream bitrate, IP camera 320 does not change any parameters of the stream. At block 2106, IP camera 320 can respond with a TMMBN message. The TMMBN message can be the temporary maximum media stream bitrate notification as defined in IETF RFC 5104. IP camera 320 can send the TMMBN message in conformity with RTCP timing rules, at the earliest opportunity after receiving the TMMBR message. At block 2108, controller 302 can receive the TMMBN message.

At block 2110, controller 302 can determine a round-trip time based on timestamps of the TMMBR message sent at block 2102 and the responsive TMMBN message received at block 2108. In this embodiment, TMMBR and TMMBN are used because the recipient of TMMBR is expected to respond with minimal (and relatively constant) internal delay, so that the time of receipt of TMMBN can be a reliable measure of round-trip time and particularly of changes or trends in round-trip time that may indicate increasing or decreasing network congestion. Other message exchanges can be substituted for TMMBR/TMMBN, provided that the measured round-trip time at the endpoint that initiates the exchange (in this case controller 302) is not affected by internal processing delays and/or scheduling effects at the other endpoint (in this case IP camera 320).

Referring again to FIG. 20, the round-trip time determined using process 2100 can be one aspect of assessing network conditions at block 2002. At block 2004, based on information determined at block 2002, controller 302 can determine whether to adjust the bitrate for the video stream. The determination can be based on various metrics, such as packet loss rate (which can be determined from RTCP reporting data), frame loss rate (which can be determined from errors in image reconstruction at controller 302), one-way transmission delay (which can be determined from the RTP data timestamps received at controller 302), and round-trip time (which can be determined using process 2100). Time derivatives of these metrics can also be considered. For example, increases in packet loss, frame loss, one-way transmission delay, and/or round trip time can all be indicators of network congestion (or other problems reducing bandwidth), and specific criteria can be defined for adjusting bitrate downward in response to such increases. Conversely, decreases in packet loss, frame loss, one-way transmission delay, and/or round trip time can indicate that additional bandwidth is available, and specific criteria can be defined for adjusting bitrate upward in response to such decreases. In some embodiments, the criteria can be defined such that bitrate is aggressively adjusted downward in response to signs of increasing congestion (e.g., using increasing round trip time as an early indicator) and conservatively adjusted upward. To reduce oscillations between bitrate tiers, a further constraint can be imposed to prevent an upward adjustment for some minimum time interval following a downward adjustment.

If block 2004 results in a determination not to adjust the bitrate, then at block 2006, controller 302 can wait for a time interval, then reassess network conditions. In some embodiments, the time interval can correspond to the RTCP reporting interval, which can be set to a reduced value of, e.g., 0.5 seconds or the like. In some embodiments, the time interval can be determined dynamically.

If block 2004 results in a determination to adjust the bitrate, then at block 2008, controller 302 can select a new bitrate tier. In some embodiments, the selection can be a ramp up or ramp down to a tier adjacent to the current tier. (If a larger adjustment is possible, it can occur through subsequent iterations of process 2000.) At block 2010, controller 302 can generate an updated stream configuration data object based on the new bitrate tier. At block 2012, controller 302 can send the updated stream configuration data object to IP camera 320; this can correspond to block 1954 of FIG. 19B. Thereafter, process 2000 can continue with controller 302 periodically assessing network conditions and adjusting the bitrate based on the assessment.

In some embodiments, alternative message formats and protocols can be used to communicate bitrate adjustments. For example, RTCP extension messages can be provided to support dynamic reconfiguration of parameters such as frame rate and image resolution, and controller 302 can send an appropriate RTCP extension message to IP camera 320.

As another example, if IP camera 320 has the definitions of the bitrate tiers from which controller 302 selects, controller 302 can send a TMMBR message (or similar message) to indicate the new bitrate tier, and IP camera 320 can determine the corresponding frame rate and image resolution. Other message formats and protocols can also be supported.

Examples of Relay Streaming

In some embodiments, a media stream can be relayed from IP camera 320 to controller 302 through one or more other devices, and/or controller 302 may relay a received media stream to another "viewing" device (which can be, e.g., a wearable device that is persistently paired with controller 302).

Figure 22:
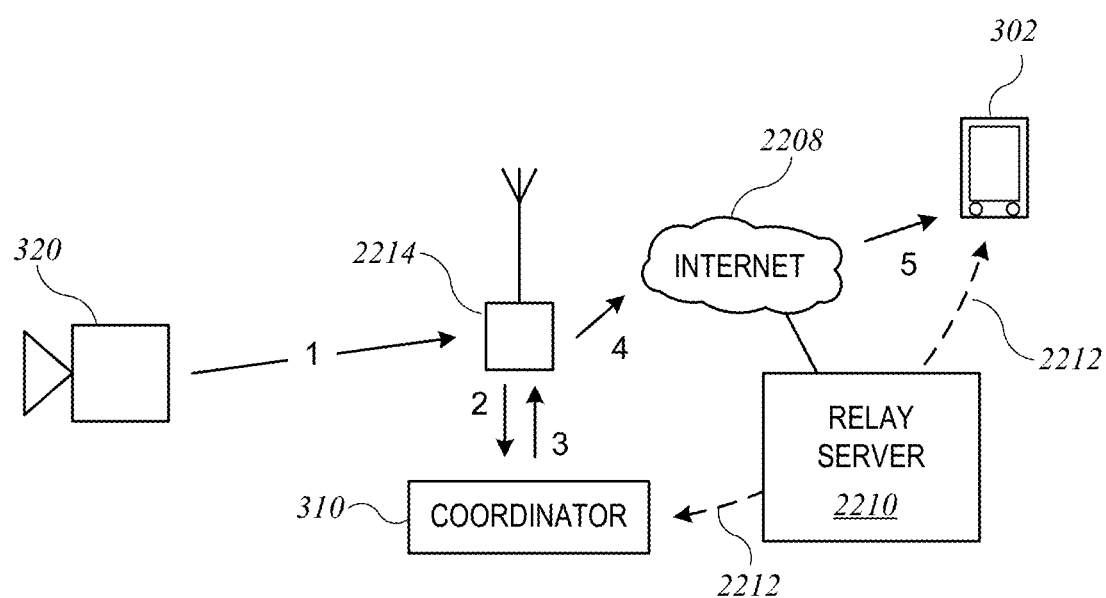
FIG. 22 illustrates a packet transmission path according to an embodiment of the present invention where coordinator acts as a packet relay.

FIG. 22 shows a packet transmission path with a relay according to an embodiment of the present invention. In this example, it is assumed that IP camera 320 and coordinator 310 are connected to a Wi-Fi network managed by base station 2214, which can be similar to base station 114 of FIG. 1. Base station 2214 acts as a gateway to internet 2208 (or other wide-area network). It is also assumed that controller 302 is not connected to the Wi-Fi network managed by base station 2214 but is connected to internet 2208.

The transmission path for a media-stream packet is represented by numbered arrows. In accordance with Wi-Fi networking protocols, communications between devices on the Wi-Fi network are routed through base station 2214. Accordingly, where coordinator 310 acts as a packet relay, media packets from IP camera 320 are sent (arrow 1) to base station 2214, which routes them (arrow 2) to coordinator 310. Coordinator 310 determines that the packets are intended for controller 302, which is reachable via internet 2208. Accordingly, coordinator 310 can route the packets (arrow 3) to base station 2214, acting as a gateway, which sends them out (arrow 4) to internet 2208. Those skilled in the art will appreciate that transmission through internet 2208 may involve multiple hops through routers, gateways, and such; these hops are not shown in FIG. 22. Eventually, the packets arrive (arrow 5) at controller 302.

In some embodiments, transmission of packets from coordinator 310 to controller 302 via internet 2208 can be accomplished using a relay server 2210, which can support secure two-way message exchange between controller devices including controller 302 and coordinator 310, as indicated by dashed arrows 2212. Coordinator 310 can route messages to relay server 2210 for delivery to controller 302, and relay server 2210 can deliver the messages to controller 302; communication in the reverse direction is also supported. If desired, the message content can be opaque to relay server 2210. In some embodiments, relay server 2210 can leverage infrastructure of a messaging service that communicates messages between user devices, such as the iMessage® service of Apple Inc., to provide a relay service for a packet stream (including a media stream). Other implementations are also possible.

To set up streaming in the configuration of FIG. 22, controller 302 can communicate with coordinator 310, which can set up a media stream from IP camera 320 on behalf of controller 302 and which can also establish a packet relay through relay server 2210 to deliver the media stream to controller 302.

Figure 23A:
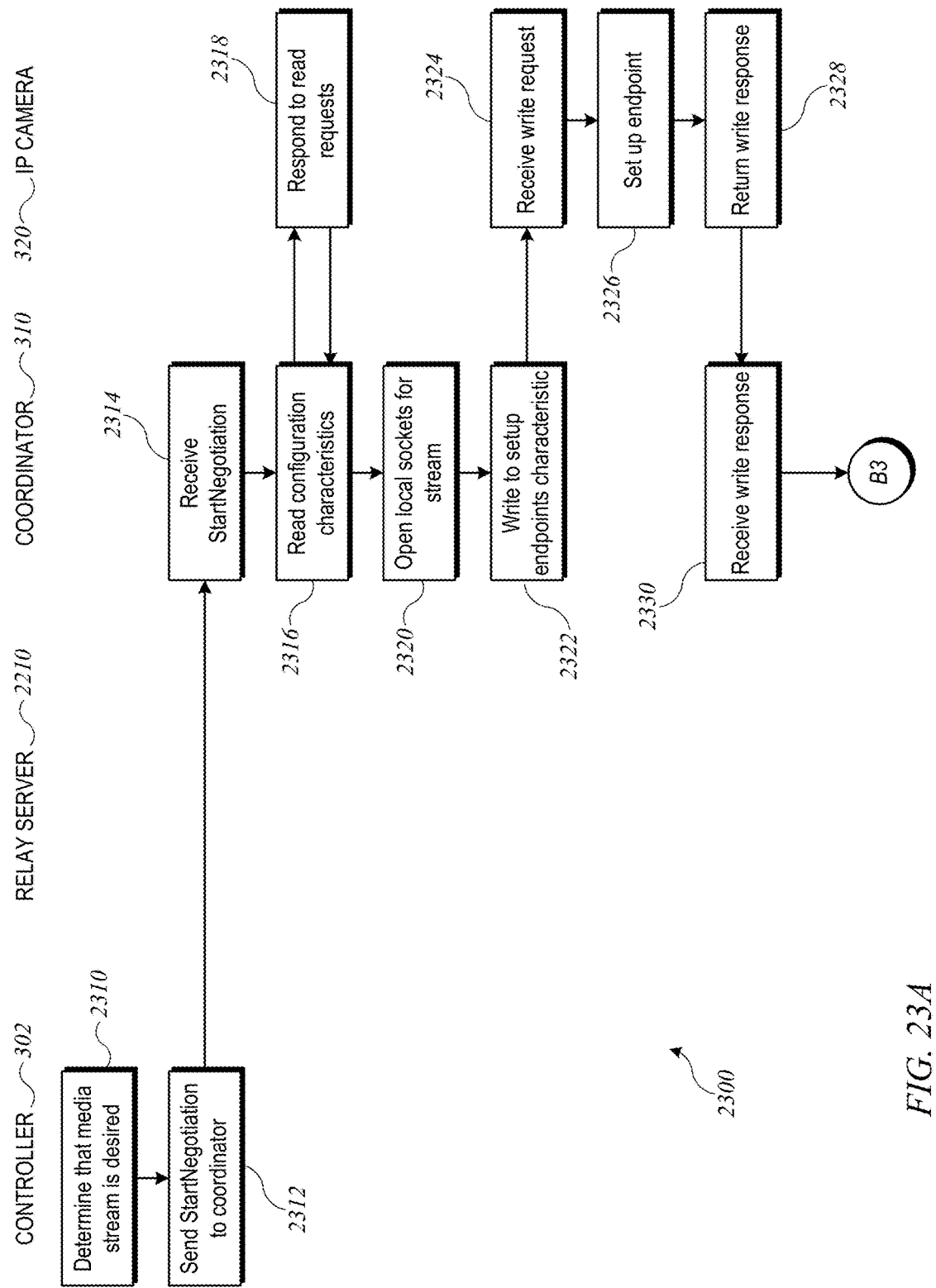
FIGS. 23A-23C show a flow diagram of a process for configuring a media stream using a coordinator and a relay server according to an embodiment of the present invention.
Figure 23B:
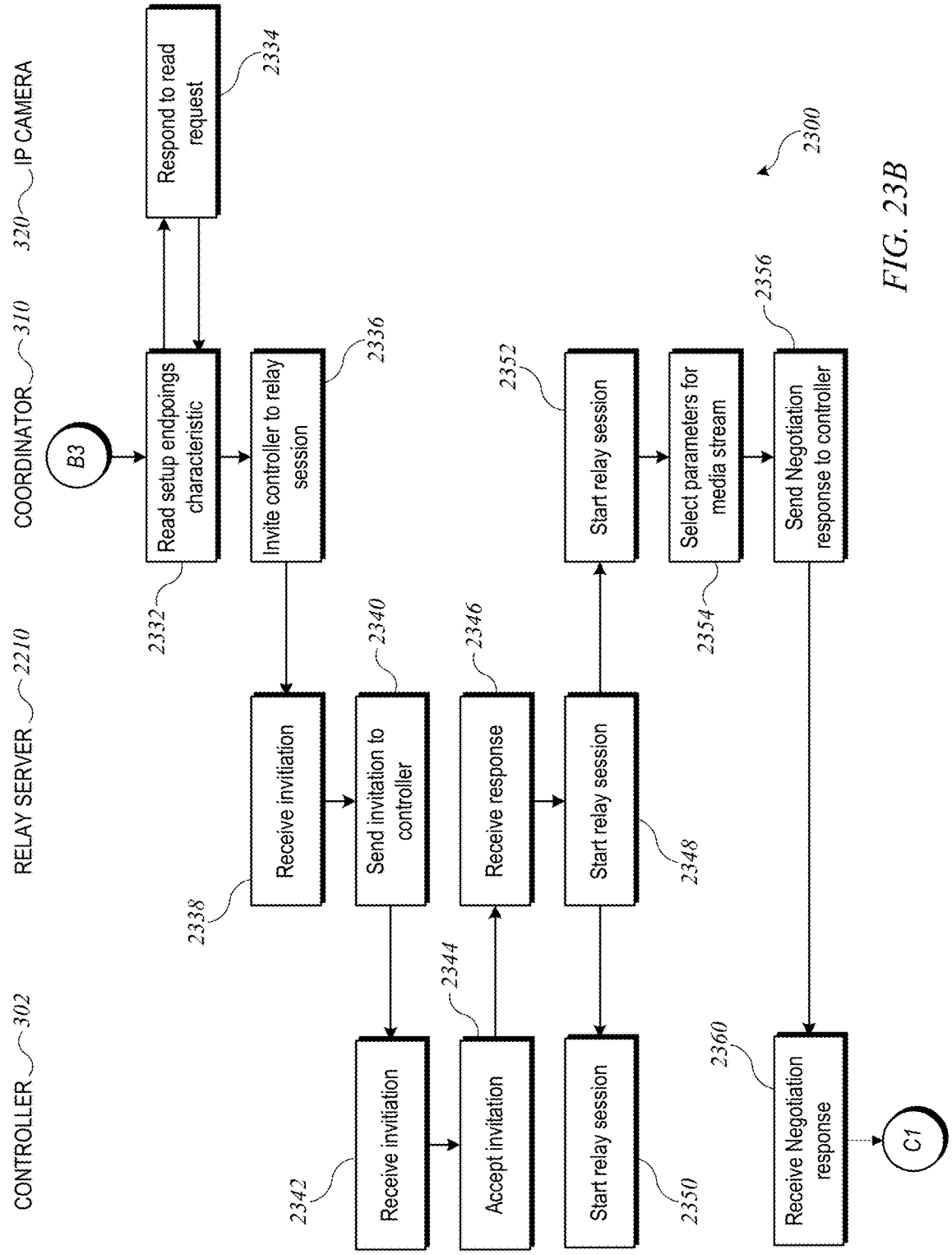
Figure 23C:
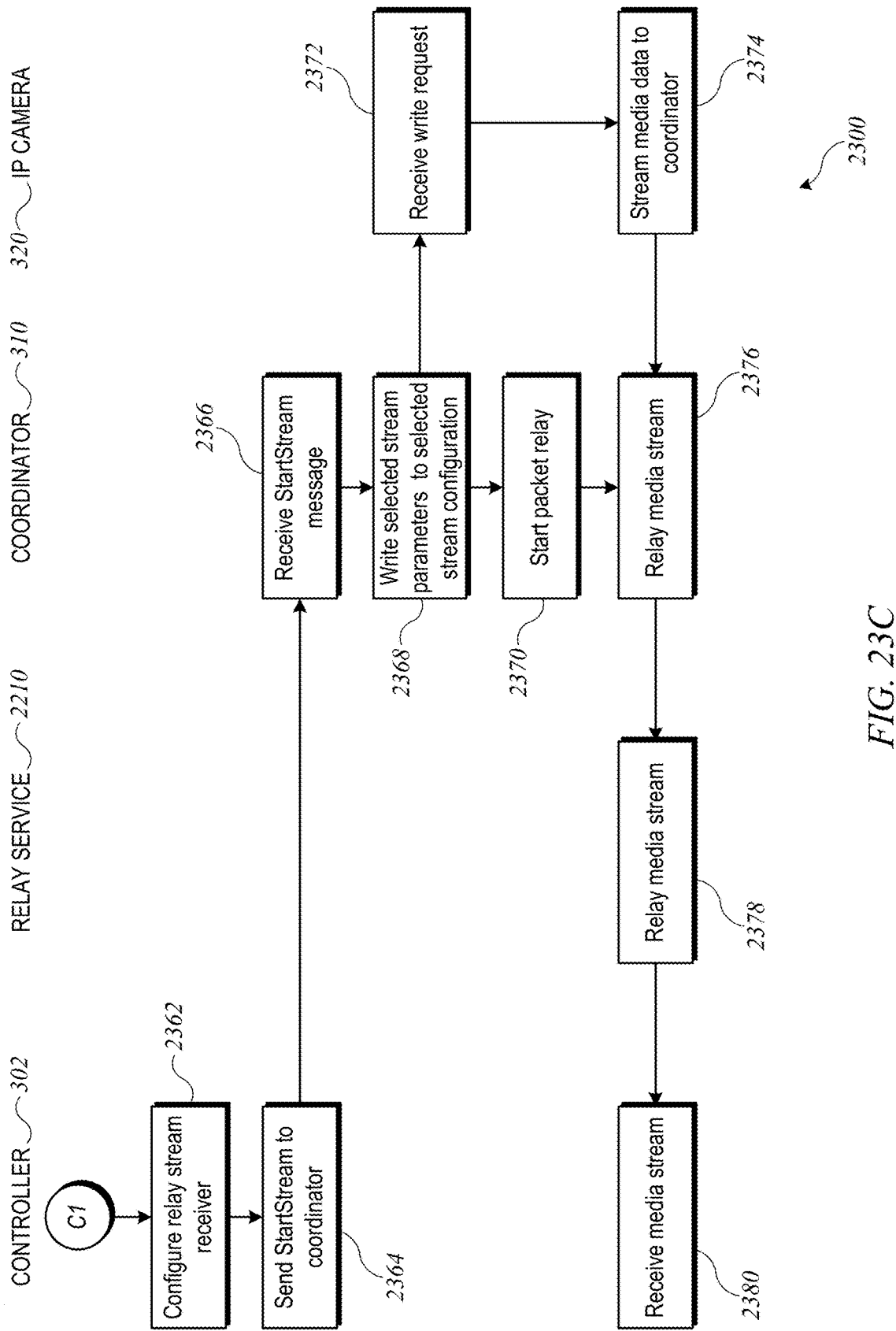

FIGS. 23A-23C show a flow diagram of a process 2300 for configuring a media stream using a coordinator and a relay server according to an embodiment of the present invention. As indicated, various portions of process 2300 can be performed by controller 302, by relay server 2210, by coordinator 310, and by IP camera 320.

Referring first to FIG. 23A, at block 2310, controller 302 can determine that it desires to receive a media stream from IP camera 320. This can be similar or identical to block 1910 of process 1900 described above. In this example, however, controller 302 obtains the stream via coordinator 310 rather than communicating directly with IP camera 320. Accordingly, at block 2312, controller 302 can send a StartNegotiation request to coordinator 310, indicating that coordinator 310 should negotiate a media streaming session with IP camera 320 and relay the packet stream to controller 302. The StartNegotiation request can include information about the media streaming capabilities of controller 302 (e.g., supported image resolutions, codecs, etc.). Although not expressly shown in FIGS. 23A-23C, all communications between controller 302 and coordinator 310 can be relayed via relay server 2210, which may provide a secure channel between controller 302 and coordinator 310.

At block 2314, coordinator 310 can receive the StartNegotiation request from controller 302. At block 2316, coordinator 310 can read streaming configuration characteristics of IP camera 320 (e.g., supported video configuration characteristic 704, supported audio configuration characteristic 706, supported RTP characteristic 708), and at block 2318, IP camera 320 can respond to the read requests from coordinator 310. These blocks can be similar to blocks 1912-1922 of process 1900, except that the device reading the characteristics is not the "viewing" device that will present the media stream to the user. Similarly to process 1900, in some embodiments, coordinator 310 can read the streaming configuration characteristics from IP camera 320 prior to receiving the StartNegotiation request at block 2314, and the information read can be cached by coordinator 310.

At block 2320, coordinator 310 can open local sockets for the stream, similarly to block 1924 of process 1900. At block 2322, coordinator 310 can write a data object (e.g., as described above with reference to FIG. 7F) to setup endpoints characteristic 712 of IP camera 320. IP camera 320 can receive the write request at block 2324. At block 2326, IP camera 320 can set up its own endpoint; this can be similar or identical to block 1930 of process 1900. At block 2328, IP camera 320 can return a response to the write request, indicating that its setup is completed. Coordinator 310 can receive the write response at block 2330.

Referring to FIG. 23B, process 2300 can continue (node B3). At block 2332, coordinator 310 can read setup endpoints characteristic 712 of IP camera 320, e.g., by sending a characteristic read request. At block 2334, IP camera 302 can respond to the read request, e.g., by sending a data object as described above with reference to FIG. 7G. Coordinator 310 can use the information to configure one or more RTP streaming sessions.

In addition to setting up a streaming session with IP camera 320 (blocks 2320-2334), coordinator 310 can also establish a relay session with controller 302 via relay server 2210. In some embodiments, establishing the relay session with controller 302 can occur in parallel with setting up the streaming session with IP camera 320. At block 2336, coordinator 310 can invite controller 302 to participate in a streaming relay session. In some embodiments, coordinator 310 can send the invitation to relay server 2210. At block 2338, relay server 2210 can receive the invitation from coordinator 310, and at block 2340, relay server 2210 can send an invitation to controller 302. In some embodiments, the invitation from coordinator 310 is sent in a format that relay server 2210 can read, so that relay server 2210 can be alerted that a streaming relay session is being requested.

This can allow relay server 2210 to allocate appropriate resources to support real-time streaming.

At block 2342, controller 302 can receive the invitation from relay server 22210. At block 2344, controller 302 can accept the invitation and send a response to relay server 2210. At block 2346, relay server 2210 can receive the response accepting the invitation, and at block 2348, relay server 2210 can start the relay session, e.g., by sending messages to coordinator 310 and controller 302 instructing them to start the relay session. The message can include configuration information (e.g., indicia to be applied to streaming packets to distinguish them from other messages or the like). At blocks 2350 and 2352, controller 302 and coordinator 310 can receive the instruction and start the session.

At this point, coordinator 310 has set up a session to receive a media stream from IP camera 320 (but has not yet started streaming) and has also established a relay session with relay server 2210 that can be used to relay the media stream to controller 302. Next, coordinator 310 can initiate the streaming. For instance, at block 2354, coordinator 310 can select parameters for the media stream (or streams, e.g., audio and video streams) to be provided by IP camera 320. The selection can be based on the streaming capabilities of controller 302 (e.g., as determined from information in the StartNegotiation message received at block 2314), the streaming capabilities of IP camera 320 (e.g., as determined by reading the configuration characteristics at block 2316), and the capabilities of relay server 2210 (which may be indicated in the start relay session message received at block 2352. In some embodiments, coordinator 310 can also take into account its own capabilities (e.g., available bandwidth for forwarding packets). The particular selection can be made as desired, provided that: (1) the media is in a format that controller 302 can process and present to a user; and (2) the bandwidth of the stream is consistent with any constraints that may be specified by controller 302, relay server 2210, coordinator 310, and/or IP camera 320. At block 2356, coordinator 310 can send a Negotiation response to controller 302. The Negotiation response can be a response to the StartNegotiation message received at block 2314 and can include the selected stream parameters from block 2354. At block 2358, controller 302 can receive the Negotiation response.

Referring to FIG. 23C, process 2300 can continue (node C1) at block 2362, at which point controller 302 can configure its relay stream receiver based on the information received in the Negotiation response, in preparation for receiving a stream. At block 2364, controller 302 can send a StartStream message to coordinator 310. In some embodiments, the negotiation messages may include a stream identifier (which can be assigned by controller 302), and the StartStream message at block 2364 can include the same stream identifier.

At block 2366, coordinator 310 can receive the StartStream message and can initiate the streaming of packets. For example, at block 2368, coordinator 310 can write the selected stream parameters (selected at block 2354) to selected stream configuration characteristic 714. The data object can be as described above with reference to FIG. 7H, and command 772 can indicate start of a session. At block 2370, coordinator 310 can also start an internal packet relay process that automatically routes streamed packets from IP camera 320 to the streaming relay session established with relay server 2210. At block 2372, IP camera 320 can receive the write request. Based on the setup information and the selected stream configuration, IP camera 320 can begin streaming media to coordinator 310 at block 2374. At block 2376, the internal packet relay process started at block 2370 can relay the stream to relay server 2210, which in turn can relay the stream to controller 302 at block 2378. At block 2380, controller 302 can receive the media stream. Controller 302 can decrypt and decode the stream and present media via its user interface.

As described above, IP camera 320 can encrypt the media-stream packets (e.g., using SRTP or the like). In some embodiments, the session key for the media stream is known to IP camera 320 and to controller 302 but not to the relaying devices (e.g., coordinator 310 and relay server 2210). Thus, the content of the media stream can be secured against eavesdroppers, even when a stream is being relayed.

In some embodiments, controller 302 can dynamically reconfigure a relayed media stream. The process for determining whether to reconfigure the stream can be similar to the reconfiguration process described above with reference to FIGS. 19B and 20-21, except that instead of communicating directly with IP camera 320 to effect the reconfiguration, controller 302 can send a Reconfigure message to coordinator 310 indicating the new streaming parameters. As described above, controller 302 can select from a set of bitrate tiers, and the Reconfigure message can indicate the selected tier. In response to the Reconfigure message, coordinator 310 can write an updated stream configuration object to selected stream configuration characteristic 714 of IP camera 320 (similarly to block 1954 of FIG. 19B), and IP camera 320 can respond as described above with reference to FIG. 19B.

In some embodiments, controller 302 can determine whether to reconfigure the stream using techniques similar to those described above. In some embodiments, controller 302 can also obtain feedback from coordinator 310. For example, referring to FIG. 22 coordinator 310 may detect congestion on the local Wi-Fi network provided by base station, which may affect streaming performance (particularly if packets make multiple hops on the local Wi-Fi network). In addition, coordinator 310 may be a multipurpose device such as a set-top box that may perform interactive operations with local users, such as streaming media for local presentation, downloading content (e.g., media or apps), and so on. Such operations may limit the bandwidth available for relaying packets to controller 302.

Figure 24:
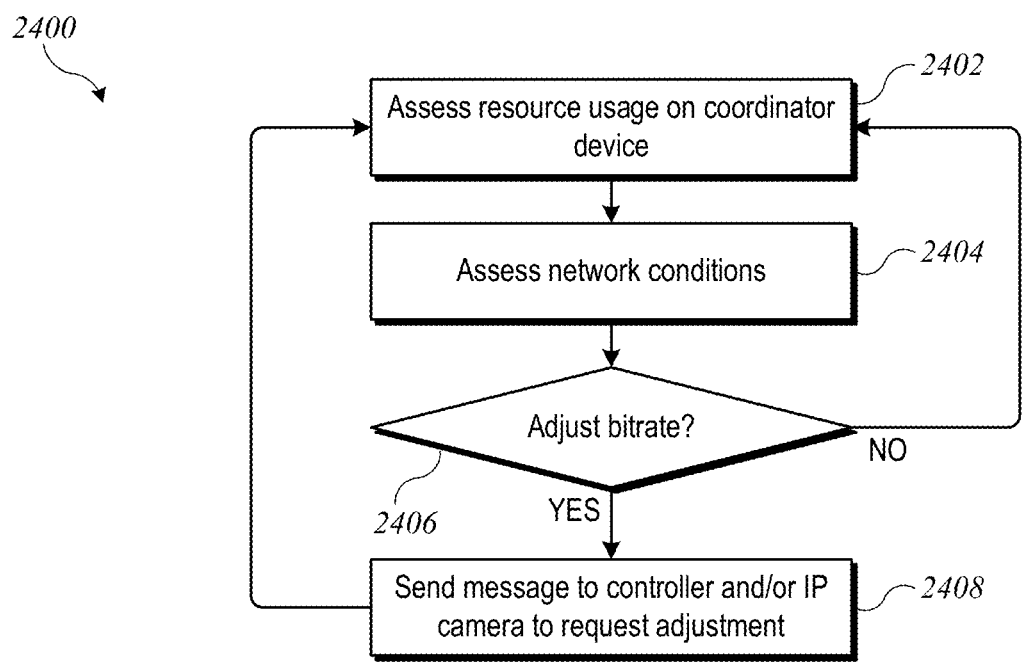
FIG. 24 is a flow diagram of a process that can be used for bitrate optimization according to an embodiment of the present invention.

Accordingly, information about network conditions and/or other conditions (e.g., local resource usage) that can be determined by coordinator 310 may be useful to controller 302 in connection with assessing network conditions during process 2000. FIG. 24 is a flow diagram of a process 2400 that can be used for bitrate optimization according to an embodiment of the present invention. Process 2400 can be implemented in coordinator 310, which can execute process 2400 while relaying media-stream packets in the manner shown in FIG. 23C.

At block 2402, coordinator 310 can assess its own resource usage. For instance, coordinator 310 can determine whether a local user is streaming media, downloading apps or other content, or doing other interactive operations that require network bandwidth or other resources of coordinator 310. In some embodiments, it may be desirable to prioritize interactive operations with a local user over "background" operations such as relaying packets, and accordingly, coordinator 310 can determine to limit the bandwidth it devotes to relaying media-stream packets. At block 2404, coordinator 310 can assess conditions of the network (e.g., round trip times for messages exchanged with IP camera 320 and/or controller 302, one-way trip times for messages received from IP camera 320 and/or controller 302, packet loss rates, retransmission rates, and so on). In some embodiments, coordinator 310 can specifically assess conditions on the local area network via which it communicates with IP camera 320; in other embodiments, coordinator 310 can assess conditions on the network path to controller 302 as well as the local area network. At block 2406, based on these assessments, coordinator 310 can determine whether to recommend an adjustment to the bitrate of the video stream that it is relaying. In some embodiments, coordinator 310 can recommend downward adjustments in the event of heavy load on itself or the network but does not recommend upward adjustments. If coordinator 310 determines to recommend an adjustment, at block 2408, coordinator 310 can send a message to controller 302 and/or IP camera 320 indicating a requested adjustment. The message can indicate whether the recommended adjustment is upward or downward.

Controller 302 can act on recommended adjustments from coordinator 310. For example, in process 2000, the decision whether to adjust the bitrate (block 2004) can depend in part on whether a message recommending an adjustment was received from coordinator 310 since the last assessment cycle.

It will be appreciated that the dynamic bitrate adjustment processes described herein are illustrative and that variations and modifications are possible. Any data that is indicative of network conditions (or changes in network conditions) can be used as an input to a decision to adjust bitrate of a stream. The decision can be made by the controller (receiving end of the stream) as described. In some embodiments, the IP camera (sending end of the stream) can also assess network conditions and adjust the bitrate or send a notification to the controller recommending an adjustment. Recommendations to adjust the bitrate of a stream can be made by any intermediary device that has the ability to assess network conditions and communicate a resulting recommendation to at least one of the endpoint devices. A coordinator or other device can act as a packet relay without being privy to the content of the packets. For example, if the media stream is encrypted using SRTP or other protocols, the encryption key(s) may be known only to the endpoints, in which case the packet relay device would not be able to interpret the packets. It should be understood that dynamic bitrate adaptation can also be applied to audio streams; however, audio streams with sufficient quality for two-way voice communication generally can be provided at low bandwidth, so any benefit of audio bitrate adaptation may be insignificant.

As described above, controller 302 can receive a media stream from IP camera 320, either directly (e.g., as in process 1900) or via coordinator 310 (e.g., as in process 2300). Controller 302 can present the received media stream at its own user interface. In some embodiments, controller 302 may also act as a companion to a second user device that has a user interface and that is capable of performing at least some controller functionality. For example, controller 302 can be a mobile phone that is paired with and acts as a companion, or supporting, device to a wearable device such as a watch, eyeglasses, or the like. A user may prefer to view the streamed media on the wearable device. Accordingly, some embodiments provide that controller 302 can relay a received media stream to a "viewing device" with which controller 302 has a secure communication channel.

Figure 25A:
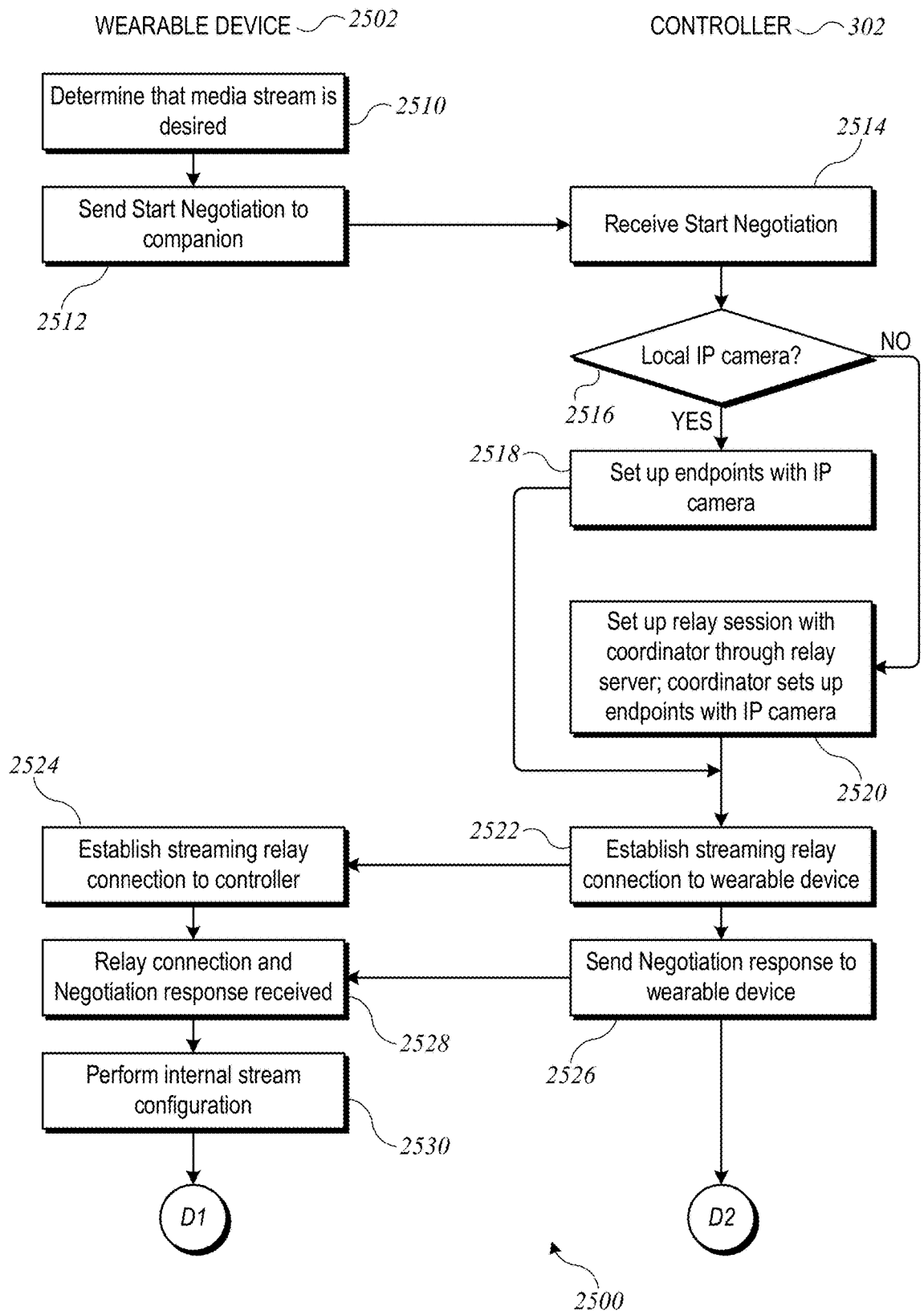
FIGS. 25A-25B show a flow diagram of a process that can be used to present a media stream from an IP camera to a viewing device according to an embodiment of the present invention.
Figure 25B:
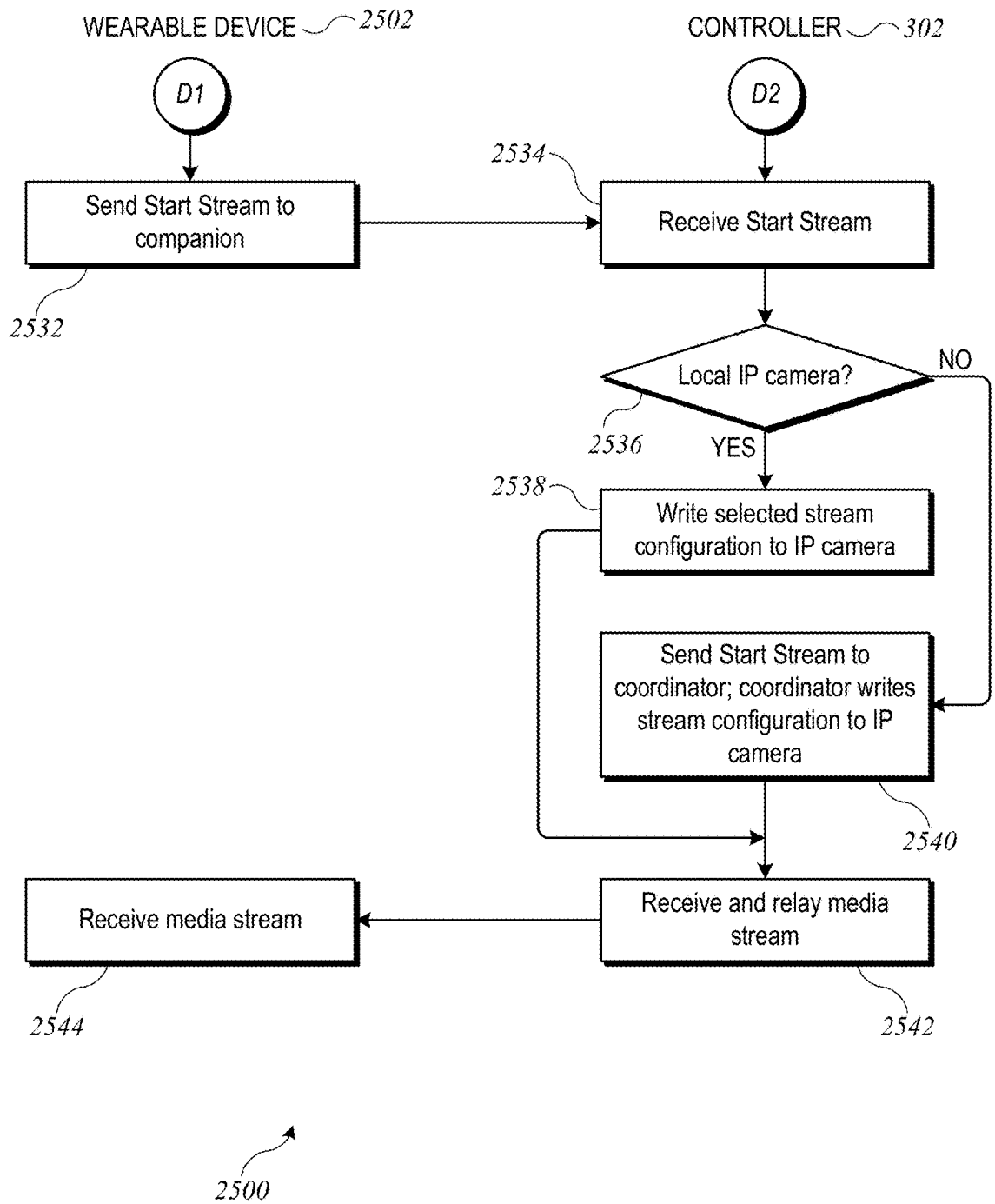

FIGS. 25A-25B show a flow diagram of a process 2500 that can be used to present a media stream from an IP camera (e.g., IP camera 320) to a separate viewing device according to an embodiment of the present invention. Portions of process 2500 can be executed by controller 302, and portions of process 2500 can be executed by a wearable device 2502, which can be any device for which controller 302 acts as a companion, or supporting, device. (Although the term "wearable" is used herein, it is to be understood that process 2500 can be applied in instances where there is a separate viewing device that is not wearable.)

In some embodiments, whether to display the media stream on controller 302 or wearable device 2502 can be determined based on which device the user operates to request a media stream. For example, in the case of integrated entry control system 300 described above, a user-visible alert when someone activates doorbell 322 can be presented by both controller 302 and wearable device 2502. (In some embodiments, controller 302 can receive the initial notification and relay the notification to wearable device 2502.) If the user responds to the notification on controller 302, then controller 302 can be the viewing device and can use either process 1900 (if direct communication with IP camera 320 is available) or process 2300 (if the communication with IP camera is via coordinator 310). If, however, the user responds to the notification on wearable device 2502, then process 2500 can be invoked.

At block 2510, wearable device 2502 can determine that a media stream is desired. For instance, a user may receive a notification of doorbell activation on wearable device 2502. Similarly to the notification screen of FIG. 4, the notification presented at wearable device 2502 can include an option to view a live view from IP camera 320. Block 2510 can include determining that the user has selected this option.

At block 2512, wearable device 2502 can send a StartNegotiation request to controller 302. This message can be similar to the StartNegotiation message sent by controller 302 at block 2312 of process 2300 and can include information about the media streaming capabilities of wearable device 2502 (e.g., supported image resolutions, codecs, etc.).

At block 2514, controller 302 can receive the StartNegotiation request from wearable device 2502. At block 2516 controller 302 can determine whether the IP camera that will be the source of the stream (e.g., IP camera 320) is local or remote. If IP camera 320 is local, then at block 2518, controller 302 can set up endpoints with IP camera 320 directly, e.g., using operations similar or identical to blocks 1912-1940 of process 1900. If IP camera 320 is not local, then at block 2520, controller 302 can set up a relay session with a coordinator (e.g., coordinator 310 and a relay server (e.g., relay server 2210), and coordinator 310 can set up endpoints with IP camera 320. These operations can be similar or identical to blocks 2312-2360 of process 2300, with the streaming capabilities of wearable device 2502 (rather than those of controller 302) being applied.

Regardless of whether IP camera 320 is local or remote, at block 2522, controller 302 can establish a streaming relay connection to the wearable device, and at block 2524, wearable device 2502 can participate in establishing the connection. In some embodiments, the streaming relay connection can use a communication channel other than the channel normally used by wearable device 2502 and controller 302. At block 2526, controller 302 can send a Negotiation response to wearable device 2502. The Negotiation response can be a response to the StartNegotiation message received at block 2514 and can include selected stream parameters (which can be selected as described above in the context of process 1900 or process 2300, depending on whether IP camera 320 is local or remote).

Selection of stream parameters can be based on the streaming capabilities of wearable device 2502 (which can be provided to controller 302 at block 2512 as described above).

At block 2528, wearable device 2502 can wait until both the streaming relay connection and the Negotiation response have been received. At block 2530, wearable device 2502 can perform internal stream-configuration operations, e.g., preparing software components to process the stream and deliver output to the user interface. At this point, wearable device 2502 is ready to receive the stream.

Referring to FIG. 25B, process 2500 can continue (nodes D1 and D2). At block 2532, wearable device 2502 can send a StartStream message to controller 302. This message can be similar to the StartStream message sent by controller 302 at block 2364 of process 2300. At block 2534, controller 302 can receive the StartStream message and can initiate the streaming of packets. For example, if, at block 2536, IP camera 320 is local, controller 302 can write a selected stream configuration to IP camera 320, which results in starting the stream; the operations can be similar or identical to blocks 1942-1948 described above. If, at block 2536, IP camera 320 is remote (not local), then at block 2540, controller 302 can send a StartStream command to coordinator 310, which can result in coordinator 310 writing a selected stream configuration to IP camera 320, which results in starting the stream; these operations can be similar to blocks 2368-2380 of process 2300. In either case, at block 2542, controller 302 can receive the media stream and relay the media stream to wearable device 2502. At block 2544, wearable device 2502 can receive the media stream. Wearable device 2502 can decrypt and decode the stream and present media via its user interface. If desired, dynamic reconfiguration techniques similar to the examples described above can be used. In some embodiments, wearable device 2502 has a small display, and the image size can be reduced accordingly, which may reduce the bandwidth to the point where dynamic reconfiguration is not useful.

The streaming processes described herein are illustrative, and variations and modifications are possible. Steps described sequentially can be performed in parallel or in a different order (except as the logic of a particular situation requires a particular order). The processes can be used in connection with an integrated accessory control system (e.g., in connection with presenting user interface screen 500 of FIG. 5, which includes a live view from an IP camera) or in any other context where it may be desirable to stream media from an IP camera or other media source to a controller device. Both local and remote streaming processes can be supported, and the controller that is requesting a stream can determine whether to communicate locally with the IP camera or through an intermediary such as coordinator 310. The media stream can be encrypted at the source device (e.g., the IP camera) and decrypted at the destination device that presents the media to the user (e.g., controller 302 or an alternative viewing device such as wearable device 2502).

Example Devices

Embodiments described herein can be implemented in electronic devices that can be of generally conventional design. Such devices can be adapted to conform to a uniform accessory protocol that supports command-and-control operations by which a controller (a first electronic device) can control operation of an accessory (a second electronic device). In some instances, a device can combine features or aspects of a controller and an accessory, e.g., in the case of a coordinator or proxy as described above.

Figure 26:
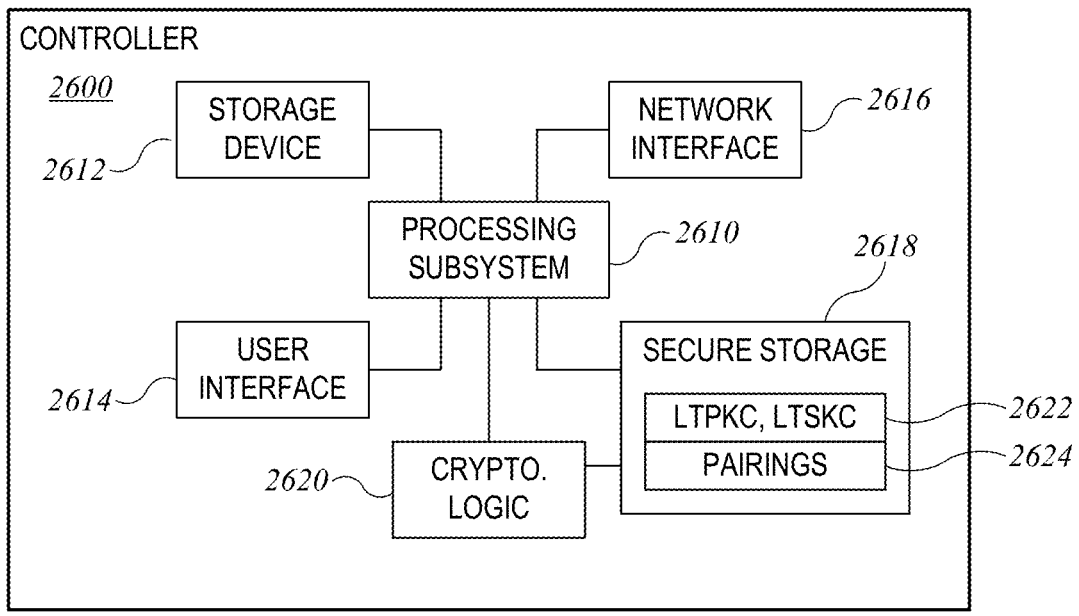
FIG. 26 shows a simplified block diagram of a controller according to an embodiment of the present invention.

FIG. 26 shows a simplified block diagram of a controller 2600 according to an embodiment of the present invention. Controller 2600 can implement any or all of the controller functions, behaviors, and capabilities described herein, as well as other functions, behaviors, and capabilities not expressly described. Controller 2600 can include processing subsystem 2610, storage device 2612, user interface 2614, communication interface 2616, secure storage module 2618, and cryptographic logic module 2620. Controller 2600 can also include other components (not explicitly shown) such as a battery, power controllers, and other components operable to provide various enhanced capabilities. In various embodiments, controller 2600 can be implemented in a desktop computer, laptop computer, tablet computer, smart phone, other mobile phone, wearable computing device, or other systems having any desired form factor. Further, as noted above, controller 2600 can be implemented partly in a base station and partly in a mobile unit that communicates with the base station and provides a user interface.

Storage device 2612 can be implemented, e.g., using disk, flash memory, or any other non-transitory storage medium, or a combination of media, and can include volatile and/or non-volatile media. In some embodiments, storage device 2612 can store one or more application and/or operating system programs to be executed by processing subsystem 2610, including programs to implement various operations described above as being performed by a controller. For example, storage device 2612 can store a uniform controller application that can read an accessory description record and generate a graphical user interface for controlling the accessory based on information therein (e.g., as described in above-referenced U.S. application Ser. No. 14/614,914). In some embodiments, portions (or all) of the controller functionality described herein can be implemented in operating system programs rather than applications. In some embodiments, storage device 2612 can also store apps designed for specific accessories or specific categories of accessories (e.g., an IP camera app to manage an IP camera accessory or a security app to interact with door lock accessories). Storage device 2612 can also store other data produced or used by controller 2600 in the course of its operations, including trigger data objects and/or other data pertaining to an environment model.

User interface 2614 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 2614 to invoke the functionality of controller 2600 and can view and/or hear output from controller 2600 via output devices of user interface 2614.

Processing subsystem 2610 can be implemented as one or more integrated circuits, e.g., one or more single-core or multi-core microprocessors or microcontrollers, examples of which are known in the art. In operation, processing system 2610 can control the operation of controller 2600. In various embodiments, processing subsystem 2610 can execute a variety of programs in response to program code and can maintain multiple concurrently executing programs or processes. At any given time, some or all of the program code to be executed can be resident in processing subsystem 2610 and/or in storage media such as storage device 2612.

Through suitable programming, processing subsystem 2610 can provide various functionality for controller 2600.

For example, in some embodiments, processing subsystem 2610 can implement various processes (or portions thereof) described above as being implemented by a controller. Processing subsystem 2610 can also execute other programs to control other functions of controller 2600, including application programs that may be stored in storage device 2612. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Communication interface 2616 can provide voice and/or data communication capability for controller 2600. In some embodiments communication interface 2616 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 2616 can provide wired network connectivity (e.g., Ethernet) in addition to or instead of a wireless interface. Communication interface 2616 can be implemented using a combination of hardware (e.g., driver circuits, antennas, modulators/demodulators, encoders/decoders, and other analog and/or digital signal processing circuits) and software components. In some embodiments, communication interface 2616 can support multiple communication channels concurrently or at different times, using the same transport or different transports.

Secure storage module 2618 can be an integrated circuit or the like that can securely store cryptographic information for controller 2600. Examples of information that can be stored within secure storage module 2618 include the controller's long-term public and secret keys 2622 (LTPKC, LTSKC as described above), and a list of paired accessories 2624 (e.g., a lookup table that maps accessory ID to accessory long-term public key LTPKA for accessories that have completed a pair setup or pair add process as described above).

In some embodiments, cryptographic operations can be implemented in a cryptographic logic module 2620 that communicates with secure storage module 2618. Physically, cryptographic logic module 2620 can be implemented in the same integrated circuit with secure storage module 2618 or a different integrated circuit (e.g., a processor in processing subsystem 2610) as desired. Cryptographic logic module 2620 can include various logic circuits (fixed or programmable as desired) that implement or support cryptographic operations of controller 2600, including any or all cryptographic operations described above. Secure storage module 2618 and/or cryptographic logic module 2620 can appear as a "black box" to the rest of controller 2600. Thus, for instance, communication interface 2616 can receive a message in encrypted form that it cannot decrypt and can simply deliver the message to processing subsystem 2610. Processing subsystem 2610 may also be unable to decrypt the message, but it can recognize the message as encrypted and deliver it to cryptographic logic module 2620. Cryptographic logic module 2620 can decrypt the message (e.g., using information extracted from secure storage module 2618) and determine what information to return to processing subsystem 2610. As a result, certain information can be available only within secure storage module 2618 and cryptographic logic module 2620. If secure storage module 2618 and cryptographic logic module 2620 are implemented on a single integrated circuit that executes code only from an internal secure repository, this can make extraction of the information extremely difficult, which can provide a high degree of security. Other implementations are also possible.

Figure 27:
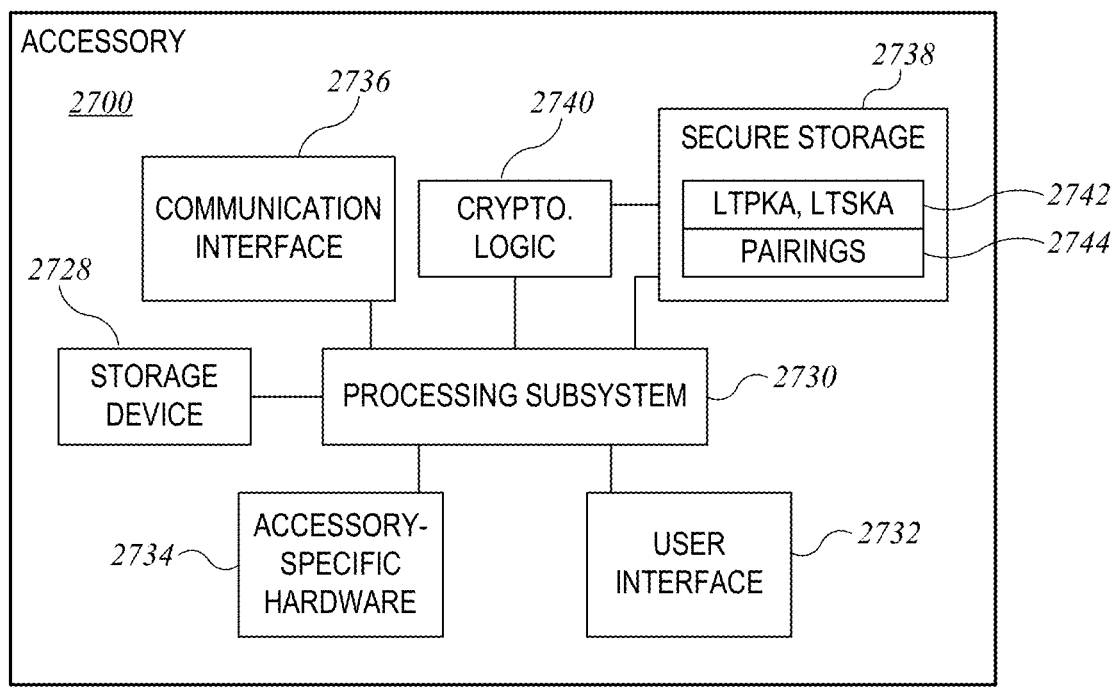
FIG. 27 shows a simplified block diagram of an accessory according to an embodiment of the present invention.

FIG. 27 shows a simplified block diagram of an accessory 2700 according to an embodiment of the present invention. Accessory 2700 can implement any or all of the accessory functions, behaviors, and capabilities described herein, as well as other functions, behaviors, and capabilities not expressly described. Accessory 2700 can include storage device 2728, processing subsystem 2730, user interface 2732, accessory-specific hardware 2734, communication interface 2736, secure storage module 2738, and cryptographic logic module 2740. Accessory 2700 can also include other components (not explicitly shown) such as a battery, power controllers, and other components operable to provide various enhanced capabilities.

Accessory 2700 is representative of a broad class of accessories that can be operated by a controller such as controller 2600, and such accessories can vary widely in capability, complexity, and form factor. Various accessories may include components not explicitly shown in FIG. 27, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 2728 can be implemented, e.g., using disk, flash memory, or any other non-transitory storage medium, or a combination of media, and can include volatile and/or non-volatile media. In some embodiments, storage device 2728 can store one or more programs (e.g., firmware) to be executed by processing subsystem 2730, including programs to implement various operations described above as being performed by an accessory, as well as operations related to particular accessory behaviors. Storage device 2728 can also store an accessory object or accessory definition record that can be furnished to controller devices, e.g., during device discovery as described in above-referenced U.S. application Ser. No. 14/614,914. Storage device 2728 can also store accessory state information and any other data that may be used during operation of accessory 2700.

Processing subsystem 2730 can include, e.g., one or more single-core or multi-core microprocessors and/or microcontrollers executing program code to perform various functions associated with accessory 2700. For example, processing subsystem 2730 can implement various processes (or portions thereof) described above as being implemented by an accessory, e.g., by executing program code stored in storage device 2728. Processing subsystem 2730 can also execute other programs to control other functions of accessory 2730. In some instances programs executed by processing subsystem 2730 can interact with a controller (e.g., controller 2600), e.g., by generating messages to be sent to the controller and/or receiving messages from the controller.

User interface 2732 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 2700, a user can operate input devices of user interface 2732 to invoke functionality of accessory 2700 and can view and/or hear output from accessory 2700 via output devices of user interface 2732. Some accessories may provide a minimal user interface or no user interface. at all. Where the accessory does not have a user interface, a user can still interact with the accessory using a controller (e.g., controller 2600).

Accessory-specific hardware 2734 can include any other components that may be present in accessory 2700 to enable its functionality. For example, in various embodiments accessory-specific hardware 2734 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 2734 and that accessory-specific hardware can include mechanical as well as electrical or electronic components.

Communication interface 2736 can provide voice and/or data communication capability for accessory 2700. In some embodiments communication interface 2736 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 2736 can provide wired network connectivity (e.g., Ethernet) in addition to or instead of a wireless interface. Communication interface 2736 can be implemented using a combination of hardware (e.g., driver circuits, antennas, modulators/demodulators, encoders/decoders, and other analog and/or digital signal processing circuits) and software components. In some embodiments, communication interface 2736 can support multiple communication channels concurrently or at different times, using the same transport or different transports.

Secure storage module 2738 can be an integrated circuit or the like that can securely store cryptographic information for accessory 2700. Examples of information that can be stored within secure storage module 2738 include the accessory's long-term public and secret keys 2742 (LTPKA, LTSKA as described above), and a list of paired controllers 2744 (e.g., a lookup table that maps controller ID to controller long-term public key LTPKC for controllers that have completed a pair setup or pair add process as described above). In some embodiments, secure storage module 2738 can be omitted; keys and lists of paired controllers can be stored in storage device 2728.

In some embodiments, cryptographic operations can be implemented in a cryptographic logic module 2740 that communicates with secure storage module 2738. Physically, cryptographic logic module 2740 can be implemented in the same integrated circuit with secure storage module 2738 or a different integrated circuit (e.g., a processor in processing subsystem 2730) as desired. Cryptographic logic module 2740 can include various logic circuits (fixed or programmable as desired) that implement or support cryptographic operations of accessory 2700, including any or all cryptographic operations described above. Secure storage module 2738 and/or cryptographic logic module 2740 can appear as a "black box" to the rest of accessory 2700. Thus, for instance, communication interface 2736 can receive a message in encrypted form that it cannot decrypt and can simply deliver the message to processing subsystem 2730. Processing subsystem 2730 may also be unable to decrypt the message, but it can recognize the message as encrypted and deliver it to cryptographic logic module 2740. Cryptographic logic module 2740 can decrypt the message (e.g., using information extracted from secure storage module 2738) and determine what information to return to processing subsystem 2730. As a result, certain information can be available only within secure storage module 2738 and cryptographic logic module 2740. If secure storage module 2738 and cryptographic logic module 2740 are implemented on a single integrated circuit that executes code only from an internal secure repository, this can make extraction of the information extremely difficult, which can provide a high degree of security. Other implementations are also possible.

Accessory 2700 can be any electronic apparatus that interacts with controller 2600. In some embodiments, controller 2600 can provide remote control over operations of accessory 2700 as described above. For example controller 2600 can provide a remote user interface for accessory 2700 that can include both input and output controls (e.g., a display screen to display current status information obtained from accessory 2700 and an input control such as a touchscreen overlay to allow changes to the status information). Controller 2600 in various embodiments can control any function of accessory 2700 and can also receive data from accessory 2700.

It will be appreciated that the system configurations and components described herein are illustrative and that variations and modifications are possible. It is to be understood that an implementation of controller 2600 can perform all operations described above as being performed by a controller and that an implementation of accessory 2700 can perform any or all operations described above as being performed by an accessory. A proxy, bridge, tunnel, or coordinator can combine components of controller 2600 and accessory 2700, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Further Embodiments

While the invention has been described with respect to specific embodiments, one skilled in the art will recognize that numerous modifications are possible. Controller networks and/or accessory networks can include as many or as few devices as desired. Use of a proxy or coordinator is not required; regardless of the number of accessories or number of controllers, it is always possible (at least in principle) to establish pairings between each controller and each accessory and to have all controllers operate by controlling accessories directly. Where an accessory-network model (e.g., an environment model) is provided, each controller can obtain a copy of the model (e.g., via synchronization) and can provide access to the model through its user interface.

Further, where proxies or controllers are present, it can be but need not be the case that all controllers are permitted to access all accessories via the proxy or controller. Some controllers might be restricted from accessing accessories when not within the local environment, and some accessories might require that controllers access them directly rather than through a proxy or coordinator.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A controller device, comprising:
    at least one memory to store information about one or more accessories;
    a wireless communication interface; and
    a processing subsystem coupled to the at least one memory and the wireless communication interface, the processing subsystem comprising one or more processors configured to:
        automatically set up a user interface for managing at least a subset of a plurality of accessory devices that enable a media streaming service by:
            obtaining an environment model for an automated environment, wherein the environment model comprises a data structure that includes a plurality of rooms and the subset of the plurality of accessory devices, each accessory device being assigned to one of the plurality of rooms, wherein each accessory device provides an instance of one or more accessory services;
            inspecting the environment model for a set of accessory service instances capable of enabling the media streaming service;
            determining, based at least in part on the inspecting, whether the set of accessory service instances provided by the accessory devices assigned to a first one of the plurality of rooms includes a minimum set of accessory services for an integrated accessory control system, wherein the minimum set of accessory services includes at least an activator accessory service of an activator accessory device, and the media streaming service of an IP camera accessory device, wherein the activator accessory device and the IP camera accessory device are separate accessory devices; and
            in response to determining that the set of accessory service instances provided by the accessory devices assigned to a first one of the plurality of rooms includes a minimum set of accessory services for an integrated accessory control system, a data object representing the integrated accessory control system to the environment model for managing the subset of the accessory devices on the user interface, wherein the data object representing the integrated accessory control system includes identifiers of the accessory devices and accessory service instances that are in the minimum set of accessory services.

2. The controller device of claim 1, wherein the activator accessory device comprises at least one of:
    a mechanical control, wherein the activator accessory service generates a notification in response to operation of the mechanical control;
    a motion sensor that detects motion in an area where the motion sensor is installed, wherein the activator accessory service generates a notification in response to detected motion;
    a movement sensor that detects movement of an object to which the movement sensor is attached, wherein the activator accessory service generates a notification in response to detected movement; or
    a sound sensor, wherein the activator accessory service generates a notification in response to a detected sound exceeding a background sound level.

3. A computer readable storage medium having stored therein program code that, when executed by one or more processors of a controller device, cause the one or more processors to perform operations comprising:
    automatically setting up a user interface for managing at least a subset of a plurality of accessory devices that enable a media streaming service by:
        obtaining an environment model for an automated environment, wherein the environment model comprises a data structure that includes a plurality of rooms and the subset of the plurality of accessory devices, each accessory device being assigned to one of the plurality of rooms, wherein each accessory device provides an instance of one or more accessory services;

inspecting the environment model for a set of accessory service instances capable of enabling the media streaming service;

determining, based at least in part on the inspecting, whether the set of accessory service instances provided by the accessory devices assigned to a first one of the plurality of rooms includes a minimum set of accessory services for an integrated accessory control system, wherein the minimum set of accessory services includes at least an activator accessory service of an activator accessory device, comprising a sensor capable of detecting an event or an action, and the media streaming service of an IP camera accessory device, wherein the activator accessory device and the IP camera accessory device are separate accessory devices; and in response to determining that the set of accessory service instances provided by the accessory devices assigned to a first one of the plurality of rooms includes a minimum set of accessory services for an integrated accessory control system, adding a data object representing the integrated accessory control system to the environment model for managing the subset of the accessory devices on the user interface, wherein the data object representing the integrated accessory control system includes identifiers of the accessory devices and accessory service instances that are in the minimum set of accessory services.

4. The computer readable storage medium of claim 3, wherein the data object representing the integrated accessory control system is usable to generate a graphical user interface for interacting with the accessory devices and accessory service instances that are included in the integrated accessory control system.

5. The computer readable storage medium of claim 3, wherein the operations further comprise:
providing a user interface to enable a user to modify the data object representing the integrated accessory control system.

6. The computer readable storage medium of claim 3, wherein the activator accessory device comprises at least one of:

a mechanical control, wherein the activator accessory service generates a notification in response to operation of the mechanical control;

a motion sensor that detects motion in an area where the motion sensor is installed, wherein the activator accessory service generates a notification in response to detected motion;

a movement sensor that detects movement of an object to which the movement sensor is attached, wherein the activator accessory service generates a notification in response to detected movement; or a sound sensor, wherein the activator accessory service generates a notification in response to a detected sound exceeding a background sound level.

7. The computer readable storage medium of claim 3, wherein the operations further comprise:
adding to the a data object representing the integrated accessory control system identifiers of one or more accessory devices and accessory service instances that are in a set of includable accessory services for the integrated accessory control system, the set of includable accessory services being disjoint with the minimum set of accessory services.

8. The computer readable storage medium of claim 3, wherein the integrated accessory control system is an integrated entry control system and wherein the minimum set of accessory services further includes a lock mechanism service usable to control a door lock.

9. The computer readable storage medium of claim 8, wherein the operations further comprise:
adding to the a data object representing the integrated accessory control system identifiers of one or more accessory devices and accessory service instances that are in a set of includable accessory services for the integrated accessory control system, the set of includable accessory services being disjoint with the minimum set of accessory services,
wherein the set of includable accessory services includes one or more of:
a light service;
a microphone service;
a speaker service; or
an alarm service.

\* \* \* \* \*